US009768850B2

(12) United States Patent
Kim

(10) Patent No.: US 9,768,850 B2
(45) Date of Patent: Sep. 19, 2017

(54) METHOD AND APPARATUS FOR SCHEDULING IN A MULTI-INPUT MULTI-OUTPUT SYSTEM

(71) Applicant: Samsung Electronics Co., Ltd., Suwon-si, Gyeonggi-do (KR)

(72) Inventor: Yong-Seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 14/666,900

(22) Filed: Mar. 24, 2015

(65) Prior Publication Data
US 2015/0282122 A1 Oct. 1, 2015

(30) Foreign Application Priority Data
Mar. 25, 2014 (KR) .................. 10-2014-0034686

(51) Int. Cl.
*H04W 4/00* (2009.01)
*H04B 7/06* (2006.01)
(Continued)

(52) U.S. Cl.
CPC ......... *H04B 7/0639* (2013.01); *H04B 7/0695* (2013.01); *H04B 7/088* (2013.01); *H04L 1/00* (2013.01); *H04L 25/03898* (2013.01); *H04B 7/0452* (2013.01); *H04B 7/063* (2013.01); *H04W 72/12* (2013.01)

(58) Field of Classification Search
CPC .... H04B 7/0617; H04B 7/0408; H04L 1/0026
See application file for complete search history.

(56) References Cited

U.S. PATENT DOCUMENTS

2009/0179797 A1* 7/2009 Kwon .................. H01Q 1/246
                                                           342/368
2010/0273499 A1* 10/2010 van Rensburg ... H04W 72/1231
                                                           455/450
(Continued)

FOREIGN PATENT DOCUMENTS

KR   10-2014-0123870 A   10/2014
WO      2013073878 A1     5/2013

*Primary Examiner* — Shaq Taha
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates beyond 4$^{th}$-Generation (4G) communication system such as Long Term Evolution (LTE). A method and an apparatus for grouping a plurality of beams into a plurality of beam groups in a wireless communication system supporting Multi-Input Multi-Output (MIMO) are provided. The method includes determining at least one preferred beam set, based on a channel between a plurality of transmission beams of a Base Station (BS) and a plurality of reception beams of a Mobile Station (MS), transmitting information on the at least one preferred beam set, to the BS, generating information indicating interference that at least one transmission beam of the BS exerts to the MS, based on a preferred reception beam comprised in the at least one preferred beam set, and transmitting the generated interference information to the BS.

20 Claims, 12 Drawing Sheets

(51) Int. Cl.
    *H04L 25/03*     (2006.01)
    *H04L 1/00*     (2006.01)
    *H04B 7/08*     (2006.01)
    *H04B 7/0452*     (2017.01)
    *H04W 72/12*     (2009.01)

(56) References Cited

U.S. PATENT DOCUMENTS

| | | | |
|---|---|---|---|
| 2013/0017855 A1* | 1/2013 | Hui | H04W 16/28 455/522 |
| 2013/0172002 A1 | 7/2013 | Yu et al. | |
| 2013/0231059 A1 | 9/2013 | Prasad et al. | |
| 2014/0004897 A1 | 1/2014 | Jung et al. | |
| 2014/0073337 A1 | 3/2014 | Hong et al. | |
| 2014/0307654 A1 | 10/2014 | Kim | |
| 2015/0139292 A1* | 5/2015 | Shirani-Mehr | H04L 5/0085 375/227 |
| 2015/0289147 A1* | 10/2015 | Lou | H04B 7/0408 370/329 |

* cited by examiner

| MS 1 SINR[dB] | | | BS TxBeamID | | | | | | | | | | | |
|---|---|---|---|---|---|---|---|---|---|---|---|---|---|---|
| | | | BS TxAntenna #0 | | | | | | BS TxAntenna #1 | | | | | |
| | | | #0 | #1 | #2 | #3 | #4 | #5 | #0 | #1 | #2 | #3 | #4 | #5 |
| MS RxBeamID | MS RxAntenna #0 | #0 | – | – | – | – | – | – | – | – | – | – | – | – |
| | | #1 | – | –10 | –2 | 9 | –10 | –18 | – | –18 | –24 | –3 | –25 | –35 |
| | | #2 | – | –10 | –2 | 9 | –10 | –18 | – | –18 | –24 | –3 | –25 | –35 |
| | | #3 | – | –8 | 0 | 10 | –8 | –15 | – | –16 | –21 | –2 | –23 | –32 |
| | | #4 | – | –5 | 2 | 13 | –5 | –12 | – | –13 | –18 | 1 | –20 | –28 |
| | | #5 | – | 0 | 7 | 16 | 0 | –7 | – | –7 | –12 | 6 | –14 | –22 |
| | | #6 | – | 10 | 16 | 24 | 10 | 4 | – | 21 | 22 | 14 | 13 | 13 |
| | | #7 | – | 0 | 7 | 16 | 0 | –7 | – | –7 | –12 | 6 | –14 | –22 |
| | | #8 | – | 4 | 11 | 20 | 4 | –2 | – | –3 | –7 | 9 | –9 | –17 |
| | MS RxAntenna #1 | #0 | – | – | – | – | – | – | – | – | – | – | – | – |
| | | #1 | – | –26 | –16 | –3 | –25 | –35 | – | –16 | –8 | 4 | –16 | –25 |
| | | #2 | – | –26 | –16 | –3 | –25 | –35 | – | –16 | –8 | 4 | –16 | –25 |
| | | #3 | – | –24 | –14 | –2 | –23 | –32 | – | –14 | –6 | 6 | –14 | –22 |
| | | #4 | – | –20 | –11 | 1 | –20 | –28 | – | –11 | –3 | 8 | –11 | –19 |
| | | #5 | – | –14 | –6 | 6 | –14 | –22 | – | –6 | 2 | 12 | –5 | –13 |
| | | #6 | – | –2 | 5 | 15 | –2 | –9 | – | 5 | 12 | 20 | 6 | –1 |
| | | #7 | – | –14 | –6 | 6 | –14 | –22 | – | –6 | 2 | 12 | –5 | –13 |
| | | #8 | – | –9 | –1 | 9 | –9 | –17 | – | –1 | 6 | 15 | –1 | –8 |

| MS 2 SINR[dB] | | | BS TxBeamID | | | | | | | | | | | |
|---|---|---|---|---|---|---|---|---|---|---|---|---|---|---|
| | | | BS TxAntenna #0 | | | | | | BS TxAntenna #1 | | | | | |
| | | | #0 | #1 | #2 | #3 | #4 | #5 | #0 | #1 | #2 | #3 | #4 | #5 |
| MS RxBeamID | MS RxAntenna #0 | #0 | – | – | – | – | – | – | – | – | – | – | – | – |
| | | #1 | – | –18 | –9 | –1 | –8 | –24 | – | –27 | –33 | –16 | –24 | –43 |
| | | #2 | – | –20 | –11 | –3 | –10 | –26 | – | –29 | –35 | –17 | –26 | –45 |
| | | #3 | – | –21 | –12 | –4 | –11 | –27 | – | –30 | –36 | –18 | –27 | –47 |
| | | #4 | – | –10 | –2 | 5 | –1 | –16 | – | –18 | –24 | –8 | –16 | –33 |
| | | #5 | – | –8 | 0 | 7 | 0 | –13 | – | –16 | –21 | –6 | –13 | –30 |
| | | #6 | – | –13 | –5 | 3 | –4 | –19 | – | –21 | –27 | –11 | –19 | –36 |
| | | #7 | – | –12 | –4 | 4 | –3 | –18 | – | –20 | –26 | –10 | –18 | –35 |
| | | #8 | – | –11 | –3 | 4 | –2 | –17 | – | –19 | –25 | –9 | –17 | –34 |
| | MS RxAntenna #1 | #0 | – | – | – | – | – | – | – | – | – | – | – | – |
| | | #1 | – | –9 | –1 | 6 | –1 | –15 | – | –1 | 6 | 12 | 6 | –6 |
| | | #2 | – | –11 | –3 | 4 | –2 | –17 | – | –3 | 4 | 11 | 5 | –8 |
| | | #3 | – | 15 | 8 | 4 | 6 | –8 | – | 15 | 14 | 19 | 12 | 0 |
| | | #4 | – | –2 | 5 | 12 | 6 | –7 | – | 5 | 12 | 18 | 12 | 1 |
| | | #5 | – | 0 | 7 | 13 | 7 | –5 | – | 7 | 13 | 0 | 14 | 2 |
| | | #6 | – | –5 | 3 | 9 | 3 | –10 | – | 3 | 9 | 16 | 10 | –2 |
| | | #7 | – | –4 | 4 | 10 | 4 | –9 | – | 4 | 10 | 10 | 11 | –1 |
| | | #8 | – | –3 | 4 | 11 | 5 | –8 | – | 4 | 11 | 17 | 12 | 0 |

FIG.4

| MS 1 RSS[dBm] | | | BS TxBeamID | | | | | | | | | | |
|---|---|---|---|---|---|---|---|---|---|---|---|---|---|
| | | | BS TxAntenna #0 | | | | | | BS TxAntenna #1 | | | | |
| | | | #0 | #1 | #2 | #3 | #4 | #5 | #0 | #1 | #2 | #3 | #4 | #5 |
| MS RxBeamID | MS RxAntenna #0 | #0 | – | – | – | – | – | – | – | – | – | – | – | – |
| | | #1 | – | –80 | –72 | –61 | –80 | –88 | – | –88 | –94 | –73 | –95 | –105 |
| | | #2 | – | –80 | –72 | –61 | –80 | –88 | – | –88 | –94 | –73 | –95 | –105 |
| | | #3 | – | –78 | –70 | –60 | –78 | –85 | – | –86 | –91 | –72 | –93 | –102 |
| | | #4 | – | –75 | –68 | –57 | –75 | –82 | – | –83 | –88 | –69 | –90 | –98 |
| | | #5 | – | –70 | –63 | –54 | –70 | –77 | – | –77 | –82 | –64 | –84 | –92 |
| | | #6 | – | –60 | –54 | –46 | –60 | –66 | – | –49 | –48 | –56 | –57 | –57 |
| | | #7 | – | –70 | –63 | –54 | –70 | –77 | – | –77 | –82 | –64 | –84 | –92 |
| | | #8 | – | –66 | –59 | –50 | –66 | –72 | – | –73 | –77 | –61 | –79 | –87 |
| | MS RxAntenna #1 | #0 | – | – | – | – | – | – | – | – | – | – | – | – |
| | | #1 | – | –96 | –86 | –73 | –95 | –105 | – | –86 | –78 | –66 | –86 | –95 |
| | | #2 | – | –96 | –86 | –73 | –95 | –105 | – | –86 | –78 | –66 | –86 | –95 |
| | | #3 | – | –94 | –84 | –72 | –93 | –102 | – | –84 | –76 | –64 | –84 | –92 |
| | | #4 | – | –90 | –81 | –69 | –90 | –98 | – | –81 | –73 | –62 | –81 | –89 |
| | | #5 | – | –84 | –76 | –64 | –84 | –92 | – | –76 | –68 | –58 | –75 | –83 |
| | | #6 | – | –72 | –65 | –55 | –72 | –79 | – | –65 | –58 | –50 | –64 | –71 |
| | | #7 | – | –84 | –76 | –64 | –84 | –92 | – | –76 | –68 | –58 | –75 | –83 |
| | | #8 | – | –79 | –71 | –61 | –79 | –87 | – | –71 | –64 | –55 | –71 | –78 |

| MS 2 RSS[dBm] | | | BS TxBeamID | | | | | | | | | | |
|---|---|---|---|---|---|---|---|---|---|---|---|---|---|
| | | | BS TxAntenna #0 | | | | | | BS TxAntenna #1 | | | | |
| | | | #0 | #1 | #2 | #3 | #4 | #5 | #0 | #1 | #2 | #3 | #4 | #5 |
| MS RxBeamID | MS RxAntenna #0 | #0 | – | – | – | – | – | – | – | – | – | – | – | – |
| | | #1 | – | –88 | –79 | –71 | –78 | –94 | – | –97 | –103 | –86 | –94 | –113 |
| | | #2 | – | –90 | –81 | –73 | –80 | –96 | – | –99 | –105 | –87 | –96 | –115 |
| | | #3 | – | –91 | –82 | –74 | –81 | –97 | – | –100 | –106 | –88 | –97 | –117 |
| | | #4 | – | –80 | –72 | –65 | –71 | –86 | – | –88 | –94 | –78 | –86 | –103 |
| | | #5 | – | –78 | –70 | –63 | –69 | –83 | – | –86 | –91 | –76 | –83 | –100 |
| | | #6 | – | –83 | –75 | –67 | –74 | –89 | – | –91 | –97 | –81 | –89 | –106 |
| | | #7 | – | –82 | –74 | –66 | –73 | –88 | – | –90 | –96 | –80 | –88 | –105 |
| | | #8 | – | –81 | –73 | –66 | –72 | –87 | – | –89 | –95 | –79 | –87 | –104 |
| | MS RxAntenna #1 | #0 | – | – | – | – | – | – | – | – | – | – | – | – |
| | | #1 | – | –79 | –71 | –64 | –71 | –85 | – | –71 | –64 | –58 | –64 | –76 |
| | | #2 | – | –81 | –73 | –66 | –72 | –87 | – | –73 | –66 | –59 | –65 | –78 |
| | | #3 | – | –55 | –62 | –66 | –64 | –76 | – | –55 | –56 | –51 | –58 | –70 |
| | | #4 | – | –72 | –65 | –58 | –64 | –77 | – | –65 | –58 | –52 | –58 | –69 |
| | | #5 | – | –70 | –63 | –57 | –63 | –75 | – | –63 | –57 | –70 | –56 | –68 |
| | | #6 | – | –75 | –67 | –61 | –67 | –80 | – | –67 | –61 | –54 | –60 | –72 |
| | | #7 | – | –74 | –66 | –60 | –66 | –79 | – | –66 | –60 | –60 | –59 | –71 |
| | | #8 | – | –73 | –66 | –59 | –65 | –78 | – | –66 | –59 | –53 | –58 | –70 |

| Rx Antenna | Rx BeamID | | BS TxBeamID | | | | | | | | | | | | |
|---|---|---|---|---|---|---|---|---|---|---|---|---|---|---|---|
| | | | BS TxAntenna #0 | | | | | | BS TxAntenna #1 | | | | | |
| | | | #0 | #1 | #2 | #3 | #4 | #5 | #0 | #1 | #2 | #3 | #4 | #5 |
| #0 | #5 | BeamSIR | - | - | - | - | - | - | - | 3 | 2 | 10 | 11 | 11 |
| | | BeamBitmap | - | - | - | - | - | - | - | 0 | 0 | 1 | 1 | 1 |

MS 2

| Rx Antenna | Rx BeamID | | BS TxBeamID | | | | | | | | | | | | |
|---|---|---|---|---|---|---|---|---|---|---|---|---|---|---|---|
| | | | BS TxAntenna #0 | | | | | | BS TxAntenna #1 | | | | | |
| | | | #0 | #1 | #2 | #3 | #4 | #5 | #0 | #1 | #2 | #3 | #4 | #5 |
| #1 | #3 | BeamSIR | - | 4 | 11 | 15 | 13 | 27 | - | - | - | - | - | - |
| | | BeamBitmap | - | 0 | 1 | 1 | 1 | 1 | - | - | - | - | - | - |

FIG.8

METHOD AND APPARATUS FOR SCHEDULING IN A MULTI-INPUT MULTI-OUTPUT SYSTEM

CROSS-REFERENCE TO RELATED APPLICATION(S)

This application claims the benefit under 35 U.S.C. §119(a) of a Korean patent application filed on Mar. 25, 2014 in the Korean Intellectual Property Office and assigned Serial number 10-2014-0034686, the entire disclosure of which is hereby incorporated by reference.

TECHNICAL FIELD

The present disclosure relates to scheduling for communication of a mobile station (MS) in a wireless communication system supporting multi-user multi-input multi-output (MU-MIMO) and single-user multi-input multi-output (SU-MIMO).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Generally, in a multi-user multi-input multi-output (MU-MIMO) and single-user multi-input multi-output (SU-MIMO) system supporting digital beamforming, a mobile station (MS) determines a channel quality index (CQI) and a precoding matrix index (PMI) based on a channel state with a base station (BS) for the sake of efficient communication with the BS and feeds back the determined CQI and PMI to the BS, and the BS schedules a plurality of MSs based on CQIs and PMIs fed back from a plurality of MSs.

Meanwhile, recent attention is being paid to a hybrid beamforming system concurrently supporting analog beamforming and digital beamforming. In the hybrid beamforming system, an effective channel can be different in accordance to a combination of analog beams. Accordingly, a situation can occur in which an MS has to determine a PMI by beam combination and select and transmit an optimal PMI to a BS. This method can increase a feedback overhead, and delay scheduling resource allocation, thereby causing uplink performance deterioration. Accordingly, there is a need to suggest a technique of feedback and scheduling of an MS in the hybrid beamforming system concurrently supporting the analog beamforming and the digital beamforming.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for grouping a plurality of beams formable by a plurality of antennas into a plurality of beam groups in a Mobile Station (MS) and a Base Station (BS) of a Multi-Input Multi-Output (MIMO) system supporting beamforming, and generating and transmitting beam-group based feedback information in the MS.

Another aspect of the present disclosure is to provide a method and an apparatus in which an MS selects an optimal transmission antenna and beam and an optimal reception antenna and beam based on channel information on a plurality of beams between the MS and a BS, and generates and transmits interference information on the selected optimal reception antenna and beam to the BS, to support Multi-User Multi-Input Multi-Output (MU-MIMO) in a MIMO system supporting beamforming.

Another aspect of the present disclosure is to provide a method and an apparatus in which an MS generates information on interference exerted to an optimal reception antenna and beam from the remnant transmission beam groups except a transmission beam group corresponding to an optimal transmission antenna and beam, and transmits the generated interference information to a BS in a MIMO system supporting beamforming.

Another aspect of the present disclosure is to provide a method and an apparatus in which an MS selects an optimal transmission antenna and beam and an optimal reception antenna and beam based on channel information on a plurality of beams between the MS and a BS, and selects additional transmission antenna and beam and reception antenna and beam within the remnant beam groups except a beam group corresponding to the optimal transmission antenna and beam, to support single-user multi-input multi-output (SU-MIMO) in a MIMO system supporting beamforming.

Another aspect of the present disclosure is to provide a method and an apparatus in which a BS determines and compares effective channel quality information of a case of using analog beamforming and effective channel quality information of a case of using hybrid beamforming based on information fed back from MSs, and selects a beamforming method and a scheduling MS in a MIMO system supporting beamforming.

In accordance with an aspect of the present disclosure, a method of an MS for grouping a plurality of beams into a plurality of beam groups in a wireless communication system supporting MIMO is provided. The method includes determining at least one preferred beam set, based on a channel between a plurality of transmission beams of a BS and a plurality of reception beams of the MS, transmitting information on the at least one preferred beam set, to the BS, generating information indicating interference that at least one transmission beam of the BS exerts to the MS, based on a preferred reception beam comprised in the at least one preferred beam set, and transmitting the generated interference information to the BS.

In accordance with another aspect of the present disclosure, a method of a BS for grouping a plurality of beams into a plurality of beam groups in a wireless communication system supporting MIMO is provided. The method includes receiving information on at least one preferred beam set that has been selected based on a channel between a plurality of transmission beams of the BS and a plurality of reception beams of an MS, from the MS, receiving information indicating interference that at least one transmission beam of the BS exerts to the MS, from the MS, and performing scheduling of the MS, based on the received interference information and the at least one preferred beam set information.

In accordance with another aspect of the present disclosure, an apparatus of an MS for grouping a plurality of beams into a plurality of beam groups in a wireless communication system supporting MIMO is provided. The apparatus includes a transceiver configured to transmit and receive a signal with a BS, and a processor configured to determine at least one preferred beam set, based on a channel between a plurality of transmission beams of a BS and a plurality of reception beams of the MS, to transmit information on the at least one preferred beam set, to the BS, to generate information indicating interference that at least one transmission beam of the BS exerts to the MS, based on a preferred reception beam comprised in the at least one preferred beam set, and to transmit the generated interference information to the BS.

In accordance with another aspect of the present disclosure, an apparatus of a BS for grouping a plurality of beams into a plurality of beam groups in a wireless communication system supporting MIMO is provided. The apparatus includes a transceiver configured to transmit and receive a signal with an MS, and a processor configured to receive information on at least one preferred beam set that has been selected based on a channel between a plurality of transmission beams of the BS and a plurality of reception beams of the MS, from the MS, to receive information interference that at least one transmission beam of the BS exerts to the MS, from the MS, and to perform scheduling of the MS, based on the received interference information and the at least one preferred beam set information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating a signal to interference noise ratio (SINR) between a transmission antenna and beam of a BS and a reception antenna and beam of an MS according to an embodiment of the present disclosure;

FIG. 5 is a diagram illustrating a beam bitmap generated based on a received signal strength (RSS) between a transmission antenna and beam of a BS and a reception antenna and beam of an MS according to an embodiment of the present disclosure;

FIG. 6 is a diagram illustrating a beam bitmap representing interference of a transmission antenna and beam of a BS with an optimal reception antenna and beam of an MS according to an embodiment of the present disclosure;

FIG. 8 is a diagram illustrating a precoding matrix index (PMI) and an SINR by beam for remnant transmission/reception antennas except optimal transmission/reception antennas and beams of a BS and MS according to an embodiment of the present disclosure;

Throughout the drawings, it should be noted that like reference numbers are used to depict the same or similar elements, features, and structures.

DETAILED DESCRIPTION

Figure 1:
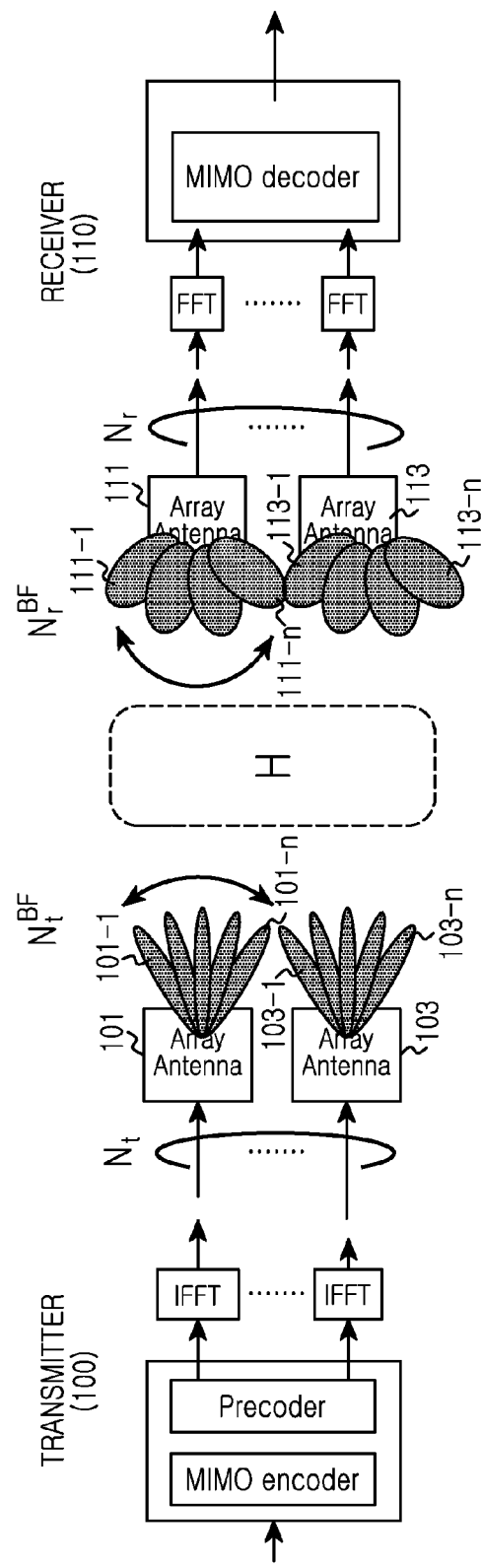
FIG. 1 is a diagram illustrating a multi-input multi-output (MIMO) system supporting hybrid beamforming according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In various embodiments of the present disclosure, the expressions "have", "can have", "comprise", "can compress", or the like indicate the existence of disclosed corresponding functions, operations, constituent elements or the like, and do not limit additional one or more functions, operations, constituent elements or the like. In addition, in the various embodiments of the present disclosure, the terms "comprise", "have" or the like indicate the existence of a feature stated in the specification, a number, an operation, a constituent element, a component, or a combination thereof. Accordingly, it should be understood that these terms do not previously exclude a possibility of existence or supplement of one or more other features, numbers, operations, constituent elements, components, or combinations thereof.

In the various embodiments of the present disclosure, the expressions "A or B", "at least one of A and/or B" or the like include any and all combinations of words enumerated together. For example, the expression "A or B" or "at least one of A and/or B" each may include A or may include B or may include all A and B.

In the various embodiments of the present disclosure, the expressions "1st", "2nd", "first", "second" or the like may modify various constituent elements according to the various embodiments of the present disclosure, but do not limit the corresponding constituent elements. For example, the expressions do not limit the order, importance and/or the like of the corresponding constituent elements. The expressions may be used to distinguish one constituent element from another constituent element. For example, a 1st user device and a 2nd user device represent different user devices. For example, a 1st constituent element may be named as a 2nd constituent element without departing from the scope of right of the various embodiments of the present disclosure. Likely, even a 2nd constituent element may be named as a 1st constituent element.

When it is mentioned that any constituent element is "connected" or "accessed" to another constituent element, the any constituent element may be directly connected or accessed to the another constituent element, but it should be understood that new other constituent element may also exist between the any constituent element and the another constituent element. In contrast, when it is mentioned that any constituent element is "directly connected" or "directly accessed" to another constituent element, it should be understood that no new other constituent element exists between the any constituent element and the another constituent element.

The expression "configured (or set) to" used in the present document may be used interchangeably with, for example, "suitable for", "having the capacity to", "designed to", "adapted to", "made to", or "capable of", in accordance to circumstances. The term "configured (or set) to" may not mean only "specifically designed to" in a hardware manner. Instead, in some circumstances, the expression "device configured to" may mean that the device "is able to ~" together with other devices or components. For example, the clause "processor configured (or set) to perform A, B, and C" may mean an exclusive processor (e.g., an embedded processor) for performing a corresponding operation, or a generic-purpose processor (e.g., a CPU or an application processor) executing one or more software programs stored in a memory device, thereby being capable of performing corresponding operations.

The terms used in the various embodiments of the present disclosure are used for just describing specific embodiments of the present disclosure, and do not intend to limit the various embodiments of the present disclosure. The expression of singular number includes the expression of plural number unless the context clearly dictates otherwise.

Unless defined otherwise, all the terms used herein including the technological or scientific terms have the same meaning as those commonly understood by a person having ordinary knowledge in the art which various embodiments of the present disclosure belong to. The terms as defined in a general dictionary should be interpreted as the same meanings as the contextual meanings of a related technology, and are not interpreted as ideal or excessively formal meanings unless defined clearly in various embodiments of the present disclosure.

In addition, the present specification is described aiming at a wireless communication network. Work achieved in the wireless communication network may be achieved in a process of controlling the network and transmitting data in a system (for example, a base station) managing the corresponding wireless communication network, or work may be achieved in a mobile station (MS) coupled to the corresponding wireless network.

A wireless communication system according to an embodiment of the present disclosure includes a plurality of base stations (BSs). Each BS provides a communication service to a specific geographical area (generally called as a cell). The cell may be again divided into a plurality of areas (or sectors).

The MS may be fixed or have mobility, and may be called other terms, such as a user equipment (UE), a mobile terminal (MT), a user terminal (UT), a subscriber station (SS), a wireless device, a personal digital assistant (PDA), a wireless modem, a handheld device, and the like.

The BS refers to a fixed station communicating with the MS, and may be called other terms, such as an evolved-Node B (eNB), a base transceiver system (BTS), an access point (AP), and the like.

In the following description, a description is made for a method and an apparatus for grouping a plurality of beams formable by a plurality of antennas into a plurality of beam groups in an MS and a BS, and generating and transmitting beam-group based feedback information in the MS in a multi-input multi-output (MIMO) system supporting beamforming. Here, the MIMO system supporting the beamforming is a meaning including a MIMO system supporting analog beamforming and a hybrid beamforming support MIMO system supporting all analog beamforming and digital beamforming. For instance, various embodiments of the present disclosure described below describe a MIMO system supporting hybrid beamforming by way of example, but may be applied in the same method even to the MIMO system supporting the analog beamforming.

FIG. 1 is a diagram illustrating a MIMO system supporting hybrid beamforming according to an embodiment of the present disclosure.

Referring to FIG. 1, in an embodiment of the present disclosure, a transmitter 100 has a plurality of transmission antennas 101, 103 each corresponding to a plurality of Radio Frequency (RF) chains. Each transmission antenna 101, 103 forms a plurality of transmission analog beams 101-1 to 101-$n$, 103-1 to 103-$n$. In addition, in the embodiment of the present disclosure, a receiver 110 has a plurality of reception antennas 111, 113 each corresponding to a plurality of RF chains. Each reception antenna 111, 113 forms a plurality of reception analog beams 111-1 to 111-$n$, 113-1 to 113-$n$. Here, the antenna is a meaning including a beam antenna and/or array antenna capable of forming a beam in a specific direction. Here, the transmitter 100 may be a BS or a MS. In addition, the receiver 110 may be a BS or a MS.

The transmitter 100 and the receiver 110 may group the plurality of transmission analog beams 101-1 to 101-$n$, 103-1 to 103-$n$ and the plurality of reception analog beams 111-1 to 111-$n$, 113-1 to 113-$n$ into a plurality of beam groups, through negotiation in compliance to a preset rule at a preset period or a specific event occurrence time point, respectively. Here, each beam group may be constructed to include at least one analog beam based on a channel characteristic. For example, the receiver 110 may perform grouping such that reception beams having similar received signal strengths (RSSs) are included in one beam group. For another example, the transmitter 100 and/or receiver 110 may perform grouping such that beams having similar channel correlation or orthogonal beams are included in one beam group.

The receiver 110 may generate beam-group based feedback information about the plurality of beams formable by the plurality of antenna provided in the transmitter 100 and the receiver 110, and transmit the generated feedback information to the transmitter 100. At this time, the transmitter 100 may broadcast unit information about the beam-group based feedback information, and the receiver 110 may generate and transmit the feedback information based on the unit information received from the transmitter 100. For example, the transmitter 100 may broadcast information indicating whether the transmitter 100 wants to receive feedback information about at least one beam included in one beam group, or whether the transmitter 100 wants to receive the feedback information about each of the plurality of beam groups. Here, the receiver 110 may generate and transmit the beam-group based feedback information, thereby decreasing an operation amount for generating the feedback information while decreasing an amount of the feedback information and decreasing an overhead of the whole system.

The transmitter 100 may select the receiver 100 to be scheduled, using the beam-group based feedback information received from the receiver 110. In addition, for communication with the receiver 100, the transmitter 100 may determine whether to use only an analog beamforming method or use a hybrid beamforming method, based on the received beam-group based feedback information. For instance, the transmitter 100 may determine effective channel quality information of a case of using only analog beamforming and effective channel quality information of a case of using hybrid beamforming based on the fed back information, and compare the determined effective channel quality information and determine the beamforming method and the receiver 100 to be scheduled.

In various embodiments of the present disclosure, for description convenience, a case where a plurality of beams form a beam group based on each antenna is described by way of example. For instance, a description is made on the assumption that the transmission beams 101-1 to 101-$n$ formed by the first transmission antenna 101 in the transmitter 100 form a first beam group, and the transmission beams 103-1 to 103-$n$ formed by the second transmission antenna 103 form a second beam group, and the reception beams 111-1 to 111-$n$ formed by the first reception antenna 111 in the receiver 110 form a third beam group and the receptions beams 113-1 to 113-$n$ formed by the second reception antenna 113 form a fourth beam group. But, the various embodiments of the present disclosure described below may be identically applied even to a case where a plurality of beams form a beam group in a different method. In addition, in the embodiment of the present disclosure described below, for description convenience, a transmission antenna and beam of a BS and a reception antenna and beam of an MS are described based on downlink transmission by way of example, but may be undoubtedly applied even to uplink transmission in the same method. For example, it is identically applicable even to a reception antenna and beam of the BS and a transmission antenna and beam of the MS.

Figure 2:
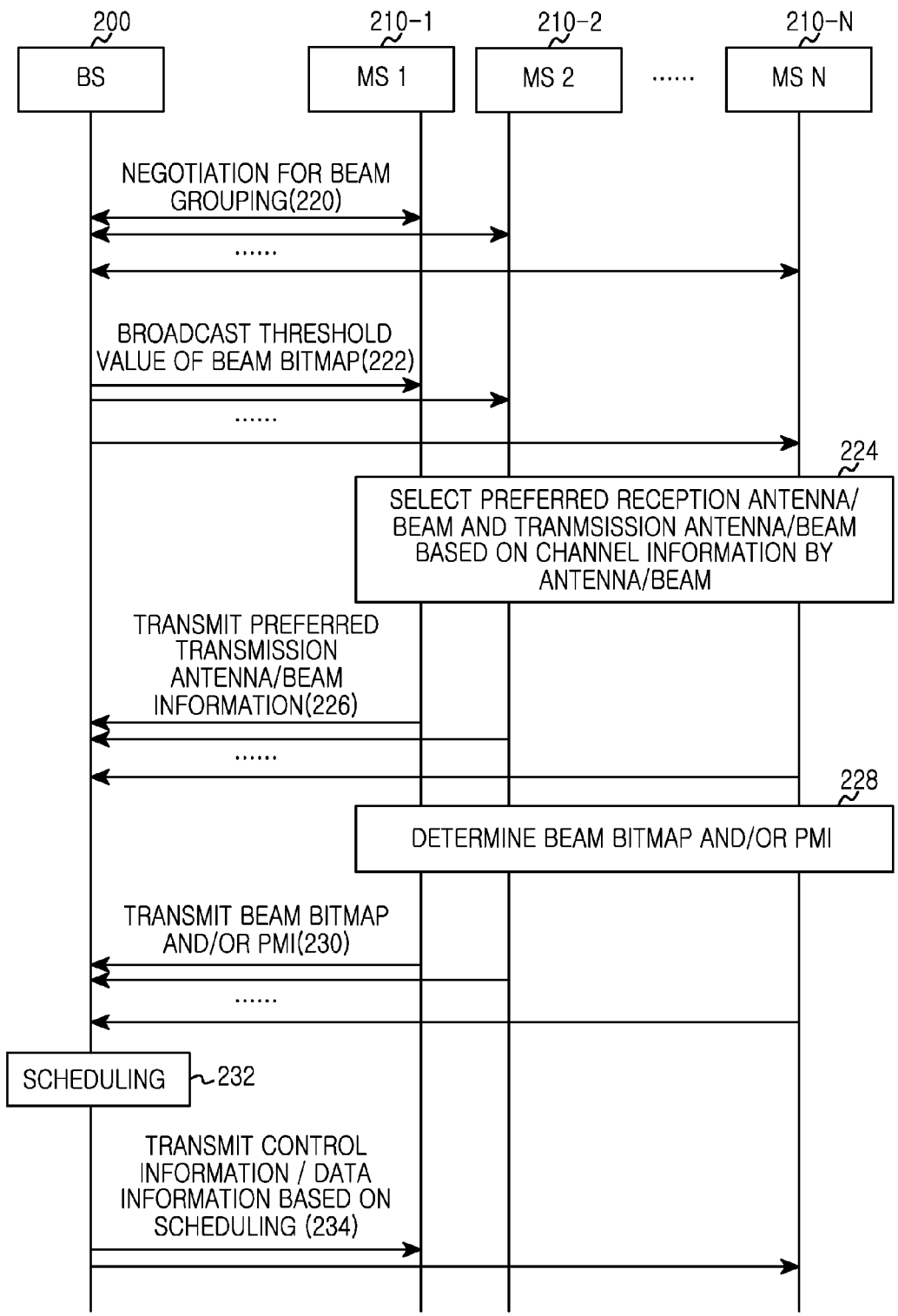
FIG. 2 is a diagram illustrating signaling for scheduling in a MIMO system supporting hybrid beamforming according to an embodiment of the present disclosure.

FIG. 2 is a diagram illustrating signaling for scheduling in a MIMO system supporting hybrid beamforming according to an embodiment of the present disclosure.

Referring to FIG. 2, in operation 220, a BS 200 performs negotiation for beam grouping with a plurality of MSs 210-1 to 210-N within a service area. For instance, the BS 200 and the plurality of MSs 210-1 to 210-N may perform beam grouping based on a channel characteristic of each of a plurality of beams at a preset period or a specific event occurrence time point. For example, the BS 200 and the MSs 210-1 to 210-N may group beams supported by self into a plurality of beam groups based on a channel characteristic, such as an RSS of each beam, channel correlation, orthogonality, and the like, and exchange information about the beam groups with one another. At this time, the BS 200 and the MSs 210-1 to 210-N each may perform the beam grouping using the same channel characteristic, or perform the beam grouping using different channel characteristics. For instance, the BS 200 and the first MS 210-1 may perform beam grouping based on a channel correlation of each beam, and the second MS 210-2 and the Nth MS 210-N may perform beam grouping based on an RSS of each beam. Such the beam grouping method may be changed variously in accordance to a design method.

Thereafter, in operation 222, the BS 200 broadcasts a threshold value of a beam bitmap. Here, the beam bitmap is information representing interference that the transmission antennas and beams of the BS 200 exert to an optimal reception antenna and beam selected in the MSs 210-1 to 210-N, and may be constructed in a bitmap form. In addition, the threshold value of the beam bitmap signifies information used to generate or construct the beam bitmap in the MSs 210-1 to 210-N. The BS 200 may determine the threshold value of the beam bitmap in accordance to a load of a system, information about an isolation distribution of the MSs, or a scheduling policy. The threshold value of the beam bitmap may be a fixed value, or may be a variable value. The BS 200 may broadcast a changed threshold value whenever there is a change of the threshold value of the beam bitmap, and may broadcast a rule of changing the threshold value of the beam bitmap and allow the MS to directly determine the changed threshold value. Additionally, the BS 200 may broadcast unit information about the beam bitmap in the aforementioned operation 220 or operation 222. For example, the BS 200 may broadcast information representing whether the beam bitmap includes information about at least one beam included in one beam group, or whether the beam bitmap includes information about each of a plurality of beam groups.

In operation 224, the MSs 210-1 to 210-N each select a preferred optimal reception antenna and beam and transmission antenna and beam set (or called an 'optimal beam set') based on channel information about each of a plurality of antennas and beams. Each of the MSs 210-1 to 210-N may acquire the channel information about the plurality of antennas and beams (e.g., a channel quality index (CQI), an RSS, a signal to interference noise ratio (SINR) and the like) through a preset duration (e.g., a beam training duration).

As one embodiment of the present disclosure, the MSs 210-1 to 210-N each may acquire channel information about transmission antennas and beams of the BS 200 and reception antennas and beams of the MSs 210-1 to 210-N based on single-input single-output (SISO), and select a preferred optimal beam set based on the acquired channel information.

Figure 3:
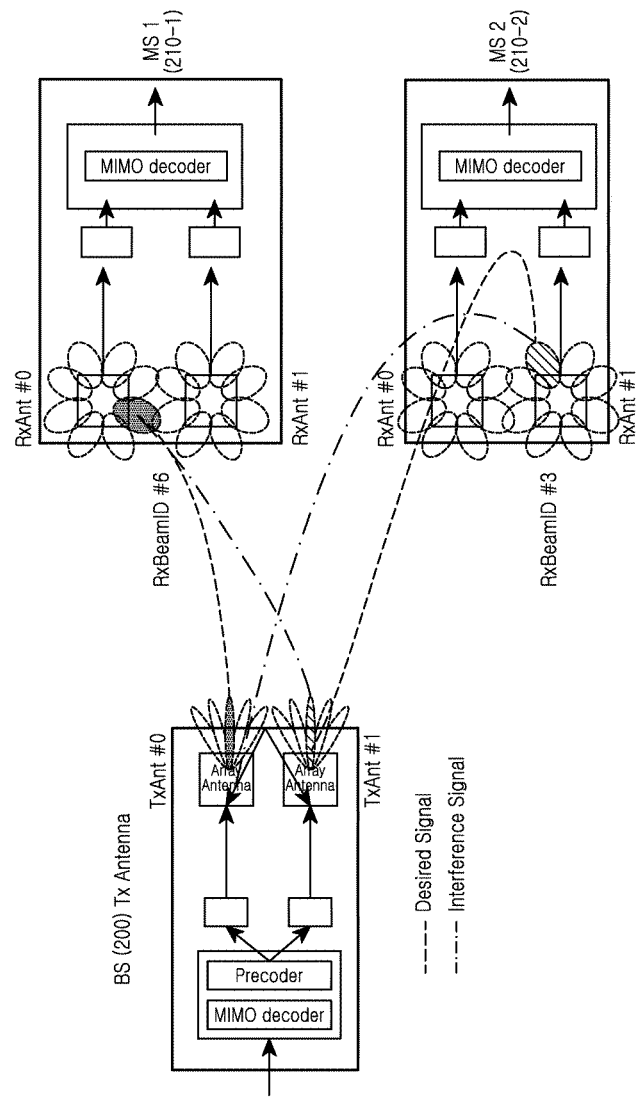
FIG. 3 is a diagram illustrating an optimal transmission antenna and beam of a base station (BS) supporting multiple user multiple input multiple output (MU-MIMO) and optimal reception antennas and beams of two mobile stations (MSs) in accordance to an embodiment of the present disclosure.

FIG. 3 is a diagram illustrating an optimal transmission antenna and beam of a BS supporting multiple user multiple input multiple output (MU-MIMO) and optimal reception antennas and beams of two MSs in accordance to an embodiment of the present disclosure. FIG. 4 is a diagram illustrating an SINR between a transmission antenna and beam of a BS and a reception antenna and beam of an MS according to an embodiment of the present disclosure.

Referring to FIGS. 3 and 4, in a case where the BS 200 has two transmission antennas each being constructed to form five beams, and the MSs 210-1 and 210-2 each have two reception antennas each being constructed to form eight beams, as illustrated in FIG. 4, the MSs 210-1 and 210-2 each may measure SINRs of the transmission antenna and beam of the BS 200 and the reception antennas and beams of the MSs 210-1 and 210-2. At this time, the first MS 210-1 may determine that a SINR is the highest 24 decibels (dB) when receiving a signal from a beam #3 of a transmission antenna #0 of the BS 200 through a beam #6 of the first MS 210-1 own reception antenna #0, and determine the beam #6 of the first MS 210-1 own reception antenna #0 and the beam #3 of the transmission antenna #0 of the BS 200 as an optimal beam set. In addition, the second MS 210-2 may determine that a SINR is the highest 19 dB when receiving a signal from a beam #3 of a transmission antenna #1 of the BS 200 through a beam #3 of the second MS 210-2 own reception antenna #1, and determine the beam #3 of the second MS 210-2 own reception antenna #1 and the beam #3 of the transmission antenna #1 of the BS 200 as an optimal beam set.

As another embodiment of the present disclosure, the MSs 210-1 to 210-N each may select a preferred optimal beam set for each reception beam group (or a reception antenna or a stream), for the sake of SU-MIMO.

Figure 7:
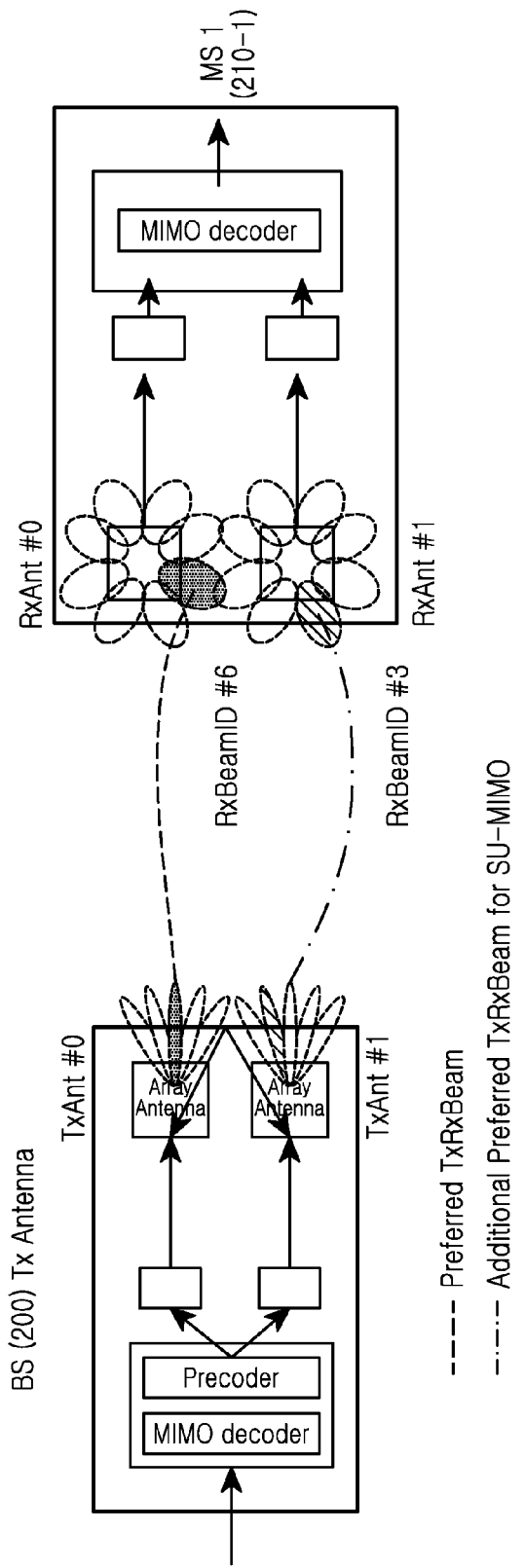
FIG. 7 is a diagram illustrating an optimal beam by antenna of a BS and single MS supporting single user multiple input multiple output (SU-MIMO) according to an embodiment of the present disclosure.

FIG. 7 is a diagram illustrating an optimal beam by antenna of a BS and single MS supporting single user multiple input multiple output (SU-MIMO) according to an embodiment of the present disclosure.

Referring to FIG. 7, in a case where the BS 200 has two transmission antennas each being constructed to form five beams, and the MS 210-1 has two reception antennas each being constructed to form eight beams, as illustrated in FIG. 4, the MS 210-1 may measure SINRs of the transmission antenna and beam of the BS 200 and the reception antenna and beam of the MS 210-1. The first MS 210-1 may determine that a SINR is the highest 24 dB when receiving a signal from a beam #3 of a transmission antenna #0 of the BS 200 through a beam #6 among beams of the first MS 210-1 own reception antenna #0, and determine the beam #6 of the first MS 210-1 own reception antenna #0 and the beam #3 of the transmission antenna #0 of the BS 200 as an optimal beam set of the reception antenna #0. Thereafter, the first MS 210-1 may determine a preferred optimal beam set of each of the remnant reception antennas, aiming at the remnant reception antennas and transmission antennas except the selected optimal reception antenna and transmission antenna. For example, referring to FIG. 4, the first MS 210-1 may determine a beam #7 of a reception antenna #1 and a beam #3 of a transmission antenna #1, as an optimal beam set of a reception antenna #1, in consideration of SINRs of beams of the reception antenna #1 and transmission antenna #1 except the reception antenna #0 and transmission antenna #0 selected as the optimal beam set of the reception antenna #0.

After selecting the preferred optimal beam set, in operation 226, each of the MSs 210-1 to 210-N transmits information about the preferred optimal beam set to the BS 200. At this time, each of the MSs 210-1 to 210-N may transmit channel information (e.g., a CQI, an RSS, a SINR and the like) about the optimal beam set, together. For example, the first MS 210-1 may feed back information representing that the optimal beam set is the beam #6 of the reception antenna #0 and the beam #3 of the transmission antenna #0 and that the SINR is 24 dB, to the BS 200. For another example, the second MS 210-2 may feed back information representing that the optimal beam set is the beam #3 of the reception antenna #1 and the beam #3 of the transmission antenna #1 and that the SINR is 19 dB, to the BS 200.

In operation 228, each of the MSs 210-1 to 210-N determines a beam bitmap and/or a precoding matrix index (PMI) based on the preferred optimal beam set. Here, each of the MSs 210-1 to 210-N may generate the beam bitmap to support MU-MIMO. In other words, if the BS 200 supports a service to other MSs through a specific transmission antenna and beam, each of the MSs 210-1 to 210-N may generate the beam bitmap representing an interference amount which self may receive from the specific transmission antenna and beam of the BS 200, in a situation in which self receives a service through the optimal beam set from the BS 200. That each of the MSs 210-1 to 210-N generates and reports the beam bitmap is for allowing the BS 200 to perform scheduling minimizing interference between the MSs 210-1 to 210-N.

Each of the MSs 210-1 to 210-N may generate the beam bitmap, based on channel information between a beam of an optimal reception antenna and beams of non-selected transmission antennas.

FIG. 5 is a diagram illustrating a beam bitmap generated based on an RSS between a transmission antenna and beam of a BS and a reception antenna and beam of an MS according to an embodiment of the present disclosure. FIG. 6 is a diagram illustrating a beam bitmap representing interference of a transmission antenna and beam of a BS with an optimal reception antenna and beam of an MS according to an embodiment of the present disclosure.

Referring to FIGS. 5 and 6, if an optimal beam set of the first MS 210-1 is a beam #6 of a reception antenna #0 and a beam #3 of a transmission antenna #0, the first MS 210-1 may determine RSSs 501 between the beam #6 of the optimal reception antenna #0 and beams #1-#5 of a non-selected transmission antenna #1 and, as illustrated in FIG. 6, the first MS 210-1 may determine signal to interference ratios (SIRs) of the beams #1-#5 of the transmission antenna #1 to the beam #6 of the optimal reception antenna #0, and generate a beam bitmap using the determined interference ratios. Here, the SIR may be determined as a difference value (e.g., 3 dB, 2 dB, 10 dB, 11 dB, 11 dB) between a channel quality (e.g., an RSS, −46 dBm) of the optimal beam set and a channel quality (e.g., an RSS, −49 dBm, −48 dBm, −56 dBm, −57 dBm, −57 dBm) of each of the beams #1-#5 of the transmission antenna #1 to the beam #6 of the optimal reception antenna #0. Here, the "-" signifies that a beam having an index of #0 does not exist. In addition, the beam bitmap may be determined in accordance to whether an SIR is greater than or is equal to a threshold value of the beam bitmap.

For instance, FIG. 6 represents a beam bitmap of a case where a threshold value of the beam bitmap is 10 dB. Because an SIR of the beam #1 of the transmission antenna #1 to the beam #6 of the optimal reception antenna #0 is 3 dB and is smaller than the threshold value 10 dB, a value of the beam bitmap may be set to '0' and, because an SIR of the beam #4 of the transmission antenna #1 to the beam #6 of the optimal reception antenna #0 is 11 dB and is greater than the threshold value 10 dB, the value of the beam bitmap may be set to '1'. At this time, in a situation in which the first MS 210-1 receives a signal from the beam #3 of the transmission antenna #0 of the BS 200 through the beam #6 of the reception antenna #0, the BS 200 may determine that an interference amount from a transmission antenna and beam having a beam bitmap value of '1' is large and an interference amount from a transmission antenna and beam having a beam bitmap value of '0' is small, and perform scheduling to provide a service to other MSs through the transmission antenna and beam having the beam bitmap value of '0'. For another example, if an optimal beam set of the second MS 210-2 is a beam #3 of a reception antenna #1 and a beam #3 of a transmission antenna #1, as illustrated in FIG. 5, the second MS 210-2 may determine RSSs 511 between the beam #3 of the optimal reception antenna #1 and beams #1-#5 of a non-selected transmission antenna #0 and, as illustrated in FIG. 6, the second MS 210-2 may determine SIRs of the beams #1-#5 of the transmission antenna #0 to the beam #3 of the optimal reception antenna #1, and generate a beam bitmap using the determined signal to interference ratios. Here, the SIR may be determined as a difference value (e.g., 4 dB, 11 dB, 15 dB, 13 dB, 27 dB) between a channel quality (e.g., an RSS, −51 dBm) of the optimal beam set and a channel quality (e.g., an RSS, −55 dBm, −65 dBm, −66 dBm, −64 dBm, −78 dBm) of each of the beams #1-#5 of the transmission antenna #0 to the beam #3 of the optimal reception antenna #1. In the drawings, the "-" signifies that a beam having an index of #0 does not exist. In addition, the beam bitmap may be determined in accordance to whether an SIR is greater than or is equal to a threshold value of the beam bitmap.

For instance, FIG. 6 represents a beam bitmap of a case where a threshold value of the beam bitmap is 10 dB. Because an SIR of the beam #1 of the transmission antenna #0 to the beam #3 of the optimal reception antenna #1 of the second MS 210-2 is 4 dB and is smaller than the threshold value 10 dB, a value of the beam bitmap may be set to '0' and, because an SIR of the beam #5 of the transmission antenna #0 to the beam #3 of the optimal reception antenna #1 is 27 dB and is greater than the threshold value 10 dB, the value of the beam bitmap may be set to '1'. At this time, in a situation in which the second MS 210-2 receives a signal from the beam #3 of the transmission antenna #1 of the BS 200 through the beam #3 of the reception antenna #1, the BS 200 may determine that an interference amount from a transmission antenna and beam having a beam bitmap value of '1' is large and an interference amount from a transmission antenna and beam having a beam bitmap value of '0' is small, and perform scheduling to provide a service to other MSs through the transmission antenna and beam having the beam bitmap value of '0'.

In addition, to support SU-MIMO, each of the MSs 210-1 to 210-N may determine an optimal beam set for a plurality of streams, and determine a PMI of each optimal beam set of each stream. For instance, as mentioned as an embodiment of the present disclosure in operation 224, the first MS 210-1 may select a preferred optimal beam set of each reception beam group (or a reception antenna, or a stream). Additionally, when the first MS 210-1 selects an optimal beam set of each stream, the first MS 210-1 may select an optimal beam set based on the channel information about the transmission antennas and beams of the BS 200 and the reception antennas and beams of the MS 210-1 and then, select an optimal beam set for the remnant stream except the stream for the selected optimal beam set.

For example, as illustrated in FIG. 4, the first MS 210-1 may determine SINRs of the transmission antennas and beams of the BS 200 and the reception antennas and beams of the first MS 210-1, and select as an optimal beam set the beam #6 of the reception antenna #0 and the beam #3 of the transmission antenna #0 whose SINR is the highest, and select an optimal beam set of the remnant stream except a first stream corresponding to the reception antenna #0 and the transmission antenna #0, i.e., a second stream corresponding to the reception antenna #1 and the transmission antenna #1.

Figure 8:
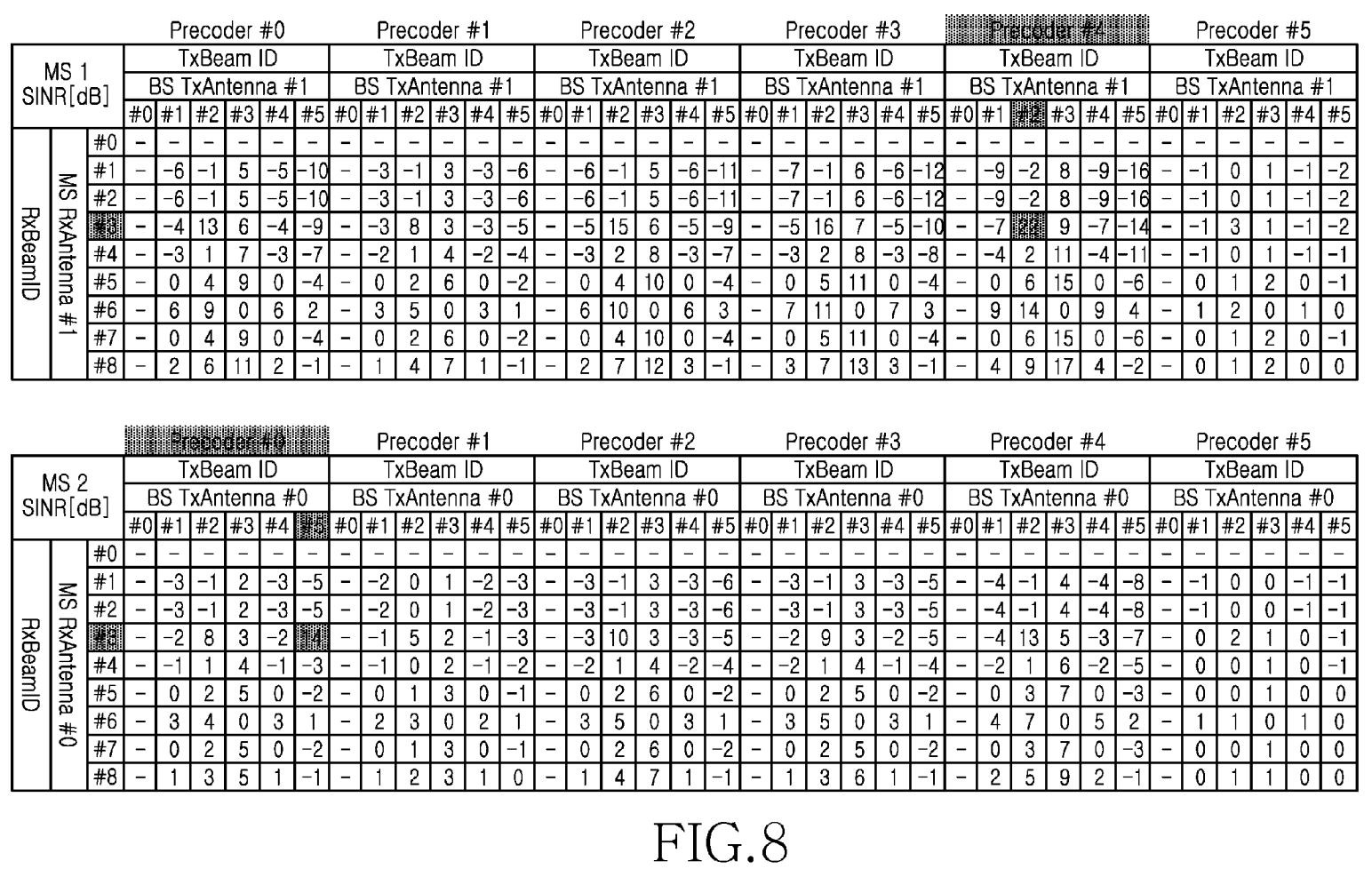

FIG. 8 is a diagram illustrating a precoding matrix index (PMI) and an SINR by beam for remnant transmission/reception antennas except optimal transmission/reception antennas and beams of a BS and MS according to an embodiment of the present disclosure.

Referring to FIG. 8, the first MS 210-1 may determine a SINR of each PMI of the second stream, and select an optimal beam set and PMI whose highest SINR is measured. The first MS 210-1 may determine that a SINR is the highest when using a PMI #4 while receiving a signal from a beam #2 of the transmission antenna #1 through a beam #3 of the reception antenna #1, regarding the second stream, and determine the beam #3 of the reception antenna #1 and the beam #2 of the transmission antenna #1 as an optimal beam set of the second stream, and determine the PMI as #4.

In the same method, as illustrated in FIG. 4, the second MS 210-2 may determine SINRs of the transmission antennas and beams of the BS 200 and the reception antennas and beams of the second MS 210-2, and select as an optimal beam set the beam #3 of the reception antenna #1 and the beam #3 of the transmission antenna #1 whose SINR is the highest, and select an optimal beam set of the remnant stream except a first stream corresponding to the reception antenna #1 and the transmission antenna #1, i.e., a second stream corresponding to the reception antenna #0 and the transmission antenna #0. At this time, as illustrated in FIG. 8, the second MS 210-2 may determine a SINR of each PMI of the second stream, and determine that a SINR is the highest when using a PMI #0 while receiving a signal from a beam #5 of the transmission antenna #0 through a beam #3 of the reception antenna #0, and determine the beam #3 of the reception antenna #0 and the beam #5 of the transmission antenna #0 as an optimal beam set of the second stream, and determine the PMI as #0.

As described above, first, selecting the optimal beam set for all of the reception antennas and beams and the transmission antennas and beams and then selecting the optimal beam for the remnant stream corresponding to the reception antenna and transmission antenna not corresponding to the optimal beam set is for decreasing an operation complexity. For instance, it may decrease a channel quality determination complexity for SU-MIMO, from $(N_r^{BF})^{N_r}s$ $(N_r^{BF})^{N_r}sN_p=5^2S8^2s6=9600$ to $(N_t^{BF})^{N_t-1}s$ $(N_r^{BF})^{N_r-1}sN_p=5^1s8^1s6=240$. Here, the '$N_t^{BF}$' represents the number of beams of each antenna of a BS, and the '$N_r^{BF}$' represents the number of beams of each antenna of an MS. In addition, the '$N_t$' represents the number of antennas of the BS, and the '$N_r$' represents the number of antennas of the MS.

After determining the beam bitmap and/or PMI, in operation 230, each of the MSs 210-1 to 210-N transmits the determined beam bitmap and/or PMI to the BS 200. Every preset period, each of the MSs 210-1 to 210-N may transmit the beam bitmap and/or PMI to the BS 200 or, whenever a value of the beam bitmap and/or PMI is changed, each of the MSs 210-1 to 210-N may transmit the changed beam bitmap and/or PMI to the BS 200. In addition, if there is a feedback information transmission request of the BS 200 or if a specific event occurs, each of the MSs 210-1 to 120-N may transmit the beam bitmap and/or PMI to the BS 200.

In operation 232, the BS 200 performs scheduling, based on the information received from the MSs 210-1 to 210-N. For example, for the sake of communication with the MS, the BS 200 may determine whether to use only an analog beamforming method or use a hybrid beamforming method, based on the received beam-group based feedback information. For instance, the BS 200 may determine effective channel quality information of a case of using only analog beamforming and effective channel quality information of a case of using hybrid beamforming based on fed back information, and determine a system efficiency for each of the determined effective channel quality information, and compare the determined system efficiencies and determine the beamforming method and the MS to be scheduled. Additionally, the BS 200 may perform the scheduling in consideration of the optimal beam set of the MS. For example, the BS 200 may determine a transmission antenna and beam exerting interference to the MS based on a beam bitmap, and control not to transmit a signal to the other MSs through a corresponding transmission antenna and beam during communication with the MS, and determine a transmission antenna and beam to be used for the communication with the MS in consideration of the optimal beam set.

Thereafter, in operation 234, the BS 200 transmits control information and data information to each MS based on the scheduling result. For example, when the BS 200 is scheduled to concurrently service the first MS 210-1 and the second MS 210-2 using the hybrid beamforming method, the BS 200 may transmit the control information and the data information to the first MS 210-1 and the second MS 210-2, using an optimal beam set corresponding to each MS.

Figure 9:
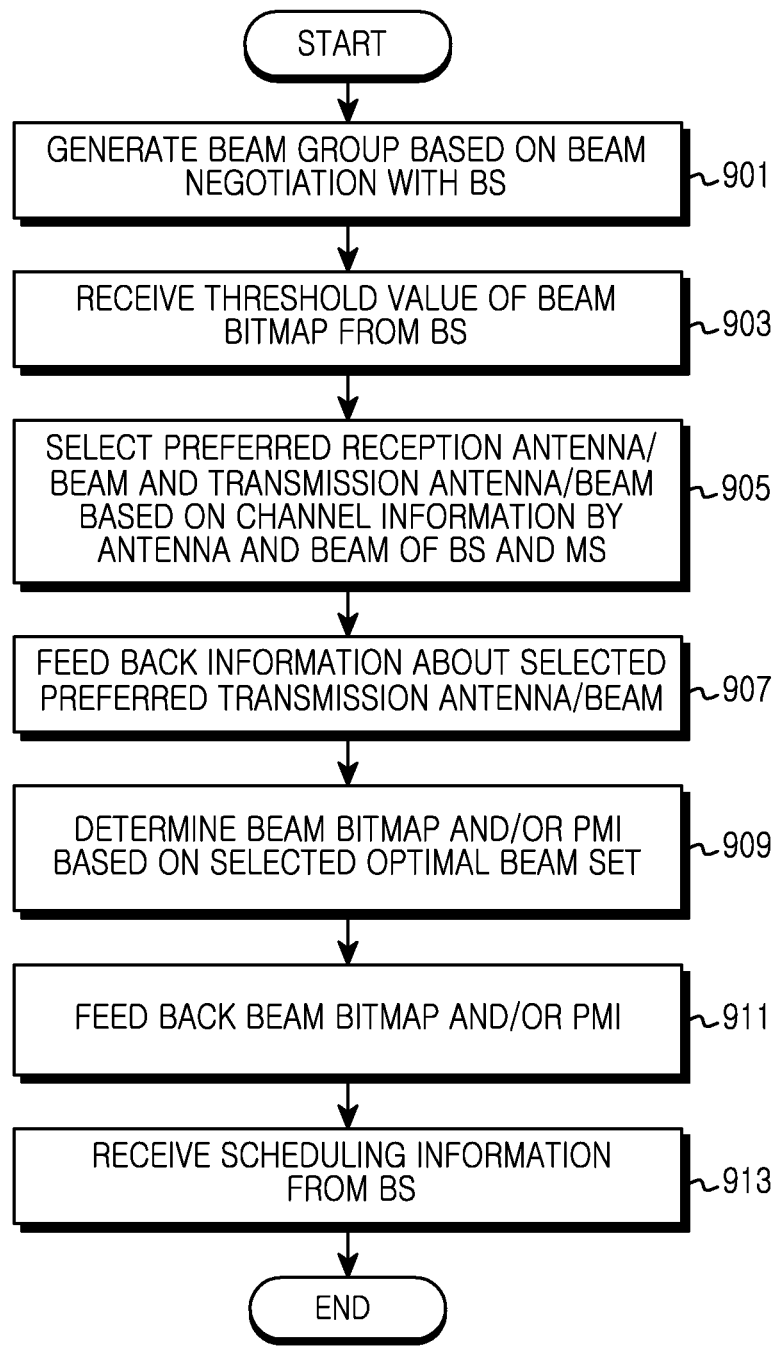
FIG. 9 is a diagram illustrating a procedure for scheduling in an MS according to an embodiment of the present disclosure.

FIG. 9 is a diagram illustrating a procedure for scheduling in an MS according to an embodiment of the present disclosure.

Referring to FIG. 9, in operation 901, the MS 210 generates a beam group based on beam negotiation with the BS 200. For instance, the MS 210 may perform beam grouping through negotiation with the BS 200 based on a channel characteristic of each of a plurality of beams at a preset period or a specific event occurrence time point. For example, the MS 210 may group beams supported by self into a plurality of beam groups based on a channel characteristic, such as a received signal strength of each beam, channel correlation, orthogonality, and the like, and exchange information about the beam groups with the BS 200. At this time, the BS 200 and the MSs 210-1 to 210-N each may perform the beam grouping using the same channel characteristic, or perform the beam grouping using different channel characteristics. The beam grouping method may be changed variously in accordance to a design method.

Thereafter, in operation 903, the MS 210 receives a threshold value of a beam bitmap from the BS 200. Additionally, the MS 210 may receive unit information about the beam bitmap. For example, the MS 210 may receive the unit information of the beam bitmap for determining whether to generate a beam bitmap including information about at least one beam included in one beam group, or whether to generate a beam bitmap including information about each of a plurality of beam groups.

Thereafter, in operation 905, the MS 210 selects a preferred optimal reception antenna and beam and transmission antenna and beam set (or called an 'optimal beam set') based on channel information about each of a plurality of antennas and beams of the BS 200 and the MS 210. The MS 210 may also acquire the channel information (e.g., a CQI, an RSS, a SINR and the like) about the plurality of antennas and beams through a preset duration.

A method of selecting the optimal beam set in the MS 210 is given as follows.

First, in a MIMO system as illustrated in FIG. 1, a reception signal may be defined as in Equation 1 below on the assumption that the number of RF chains of a transmitter is '$N_t^{RF}$', and the number of RF chains of a receiver is '$N_r^{RF}$', and the number (or the number of array antennas) of antennas of the transmitter is '$N_t$', and the number of antennas of the receiver is '$N_r$', and the number of antenna constituent elements of each antenna in the transmitter is '$N_t^{el}$', and the number of antenna constituent elements of each antenna in the receiver is '$N_r^{el}$', and the number of beamforming directions of each antenna of the transmitter is '$N_t^{BF}$', and the number of beamforming directions of each antenna of the receiver is '$N_r^{BR}$', and the number of data streams is '$N_s$'.

Equation 1

$$y(k) = V(\varphi_j)^T \{H(k)W(\theta_i)P(k)s(k) + n(k)\} =$$
$$V(\varphi_j)^T H(k)W(\theta_i)P(k)s(k) + V(\varphi_j)^T n(k) = H^{eff}(k, \varphi_j, \theta_i)P(k)s(k) + n(k)$$

The '$y(k)$' signifies a baseband reception symbol vector of a kth subcarrier, and may be constructed in a $[N_r^{RF}s1]$ form. The '$V(\varphi_j)$' is a reception analog beamforming matrix of a $[N_rN_r^{el}sN_r^{RF}]$ form having a jth reception beam set ($\varphi_j$). Here, the '$\varphi_j$' signifies the jth reception beam set for all array antennas of the receiver, and may be constructed in a '$[\varphi_0 \ldots \varphi_m \ldots \varphi_{N_{r-1}}]$' form. At this time, the '$\varphi_m$' signifies a reception beam index in an mth array antenna of the receiver, and the '$\varphi_m=0$' signifies that there is not a reception beam in the mth array antenna of the receiver. The '$H(k)$' is a channel matrix of the kth subcarrier in a frequency domain, and may be constructed in a '$[N_rN_r^{el}sN_tN_t^{el}]$' form. The '$W(\Theta_i)$' signifies a transmission analog beamforming matrix of a '$[N_tN_t^{el}sN_t^{RF}]$' form having an $i^{th}$ transmission beam set ($\Theta_i$). Here, the '$\Theta_i$' signifies an $i^{th}$ transmission beam set for all array antennas of the transmitter, and may be constructed in a '$[\theta_0 \ldots \theta_n \ldots \theta_{N_{t-1}}]$' form. At this time, the '$\theta_n$' signifies a transmission beam index in an nth array antenna of the transmitter, and the '$\theta_n=0$' signifies that there is not a transmission beam in the nth array antenna of the transmitter. The '$H_{eff}(k,\Phi_j,\Theta_i)$' is an effective channel matrix of a kth subcarrier having an $i^{th}$ transmission and jth reception beam set $(\Theta_i, \Phi_j)$, and may be constructed in a '$[N_r^{RF} s N_t^{RF}]$' form. The 'P(k)' is a precoding matrix of the kth subcarrier, and may be constructed in a '$[N_t^{RF} s N_s]$' form. The 's(k)' is a baseband transmission symbol vector of the kth subcarrier, and may be constructed in a '$[N_s 1]$' form. In addition, the 'n(k)' signifies a complex additive white Gaussian noise vector, and may be constructed in a '$[N_r N_r^{el} s 1]$' form.

In the aforementioned MIMO system, the MS 210 may select the optimal beam set in a method of Equation 2 or Equation 3 below, using a metric, such as a capacity, a SINR, an RSS, and the like, such that the MS 210 can best receive data streams of an 's' number using transmission antennas of an 'x' number and reception antennas of a 'y' number. Here, the 'x' is smaller than or is equal to the '$N_t$', and the 'y' is smaller than or is equal to the '$N_r$', and the 's' is smaller than or is equal to the '$N_s$'.

Equation 2 below represents a method of determining the optimal beam set using the capacity.

Equation 2

$$(\overline{\Theta, \Phi}) = \arg\max_{\Theta_i HB_t, \Phi_j HB_r} \sum_{k=0}^{N_{sc}-1} \log_2\left(1 + \frac{|H^{eff}(k, \Phi_j, \Theta_i)|^2}{N_0}\right)$$

Here, the '$(\overline{\Theta,\Phi})$' signifies an optimal beam set representing a selected optimal transmission antenna and beam and optimal reception antenna and beam, and the '$N_{sc}$' signifies the number of allocated subcarriers, the '$B_t^x$' signifies a set of transmission beams using transmission antennas of an 'x' number of a transmitter, and the '$B_r^y$' signifies a set of reception beams using reception antennas of a 'y' number of a receiver, and the '$(\overline{\Theta,\Phi})$' signifies a set of an ith transmission beam and a jth reception beam.

Equation 3 below represents a method of determining the optimal beam set using the SINR.

Equation 3

$$(\overline{\Theta, \Phi}) = \arg\max_{\Theta_i HB_t, \Phi_j HB_r} \sum_{k=0}^{N_{sc}-1}\left(\frac{|H^{eff}(k, \Phi_j, \Theta_i)|^2}{I(k, \Phi_j)}\right) = \qquad (3)$$

$$\arg\max_{\Theta_i HB_t, \Phi_j HB_r} \sum_{k=0}^{N_{sc}-1}\left(\frac{|V^T(\Phi_j) H(k) W \Theta_i|^2}{I(k, \Phi_j)}\right)$$

Here, the '$(\overline{\Theta,\Phi})$' signifies an optimal beam set representing a selected optimal transmission antenna and beam and optimal reception antenna and beam, and the '$N_{sc}$' signifies the number of allocated subcarriers, the '$B_t^x$' signifies a set of transmission beams using transmission antennas of an 'x' number of a transmitter, and the '$B_r^y$' signifies a set of reception beams using reception antennas of a 'y' number of a receiver, and the '$(\overline{\Theta,\Phi})$' signifies a set of an ith transmission beam and a jth reception beam. The '$I(k,\Phi_j)$' signifies an interference power using a jth reception beam set.

The MS 210 may select the optimal beam set using Equation 2 or 3. After selecting the optimal beam set, in operation 907, the MS 210 feeds back information about a preferred transmission antenna and beam included in the selected optimal beams set, to the BS 200. At this time, the MS 210 may feed back channel information (e.g., a CQI, an RSS, a SINR and the like) about the optimal beam set, together.

Thereafter, in operation 909, the MS 210 may determine a beam bitmap and/or PMI based on the selected optimal beam set. In operation 911, the MS 210 may feed back the determined beam bitmap and/or PMI. In other words, if the BS 200 supports a service to other MSs through a specific transmission antenna and beam, the MS 210 may generate the beam bitmap representing an interference amount which self may receive from the specific transmission antenna and beam of the BS 200, in a situation in which self receives a service through the optimal beam set from the BS 200. In addition, that the MS 210 reports the beam bitmap is for allowing the BS 200 to perform scheduling minimizing interference between MSs.

The MS 210 may determine a metric for beam bitmap generation using a beam channel correlation, an RSS, a SIR, a capacity deterioration rate, or the like.

Equation 4 below represents a method of determining the metric for beam bitmap generation using the beam channel correlation.

Equation 4

$$BeamBitmapMetric_{(\Theta_m, \overline{\Phi})} =$$

$$BeamCorr_{(\Theta_m, \overline{\Phi})} = \frac{1}{N_{sc}} \sum_{k=0}^{N_{sc}-1} corr(H(k, \overline{\Phi}, \Theta_m), H(k, \overline{\Phi}, \overline{\Theta}))$$

Here, the '$H(k,\overline{\phi},\overline{\theta})$' represents an effective channel matrix of a selected optimal beam set in a kth subcarrier. Here, the '$\overline{\theta}$' represents a selected optimal transmission antenna and beam, and the '$\overline{\phi}$' represents an optimal reception antenna and beam. In addition, the '$H(k,\overline{\phi},\overline{\theta_m})$' represents an effective channel matrix of a transmission/reception beam set in the kth subcarrier. Here, the '$\overline{\theta_m}$' represents an mth beam of an '$N_t-x$' transmission antenna, and the '$\overline{\phi}$' represents a selected optimal reception antenna and beam.

Equation 5 below represents a method of determining the metric for beam bitmap generation using the beam SIR.

Equation 5

$$BeamBitmapMetric_{(\Theta_m, \overline{\Phi})} = BeamSIR_{(\Theta_m, \overline{\Phi})} = \frac{1}{N_{sc}} \sum_{k=0}^{N_{sc}-1} \frac{RSS_{(k, \overline{\Theta}, \overline{\Phi})}}{RSS_{(k, \Theta_m, \overline{\Phi})}}$$

Here, the '$RSS_{(k,\overline{\Theta},\overline{\Phi})}$' represents a received signal strength of a selected optimal beam set in a kth subcarrier. Here, the '$\overline{\Theta}$' represents a selected optimal transmission antenna and beam, and the '$\overline{\Phi}$' represents an optimal reception antenna and beam. In addition, the '$RSS_{(k,\overline{\Phi},\Theta_m)}$' represents a received signal strength of a transmission/reception beam set in the kth subcarrier. Here, the '$\Theta_m$' represents an mth beam of an '$N_t-x$' transmission antenna, and the '$\overline{\Phi}$' represents a selected optimal reception antenna and beam.

After determining the metric for beam bitmap generation as in Equations 4 and 5, the MS 210 may generate a beam bitmap as in Equation 6 below.

Equation 6 for $m = 0 \sim B_t^{N_t-x} - 1$ $BeamBitmap[m] =$ $$\begin{cases} 1, & BeambitmapMetric_{(\Phi_m, \overline{\Phi})} > BeamBitmap_{threshold} \\ 0, & \text{elsewise} \end{cases}$$

Here, the '$B_t^{N_t-x}$' signifies a transmission beam set in an '$(N_t-x)$' antenna of a transmitter.

For example, the MS 210 may generate a beam bitmap, based on a beam channel correlation or SIR between a beam of an optimal reception antenna and beams of a non-selected transmission antenna. For example, if an optimal beam set of the MS 210 is a beam #6 of a reception antenna #0 and a beam #3 of a transmission antenna #0, as illustrated in FIG. 5, the MS 210 may determine RSSs between the beam #6 of the optimal reception antenna #0 and beams #1-#5 of a non-selected transmission antenna #1 and, as illustrated in FIG. 6, the MS 210 may determine SIRs of the beams #1-#5 of the transmission antenna #1 to the beam #6 of the optimal reception antenna #0, and generate a beam bitmap using the determined SIRs. Here, the SIR may be determined as a difference value (e.g., 3 dB, 2 dB, 10 dB, 11 dB, 11 dB) between a channel quality (e.g., an RSS, −46 dBm) of the optimal beam set and a channel quality (e.g., an RSS, −49 dBm, −48 dBm, −56 dBm, −57 dBm, −57 dBm) of each of the beams #1-#5 of the transmission antenna #1 to the beam #6 of the optimal reception antenna #0. Here, the "-" signifies that a beam having an index of #0 does not exist. In addition, the beam bitmap may be determined in accordance to whether an SIR is greater than or is equal to a threshold value of the beam bitmap.

For instance, FIG. 6 represents a beam bitmap of a case where a threshold value of the beam bitmap is 10 dB. Because an SIR of the beam #1 of the transmission antenna #1 to the beam #6 of the optimal reception antenna #0 is 3 dB and is smaller than the threshold value 10 dB, a value of the beam bitmap may be set to '0' and, because an SIR of the beam #4 of the transmission antenna #1 to the beam #6 of the optimal reception antenna #0 is 11 dB and is greater than the threshold value 10 dB, the value of the beam bitmap may be set to '1'. At this time, in a situation in which the MS 210 receives a signal from the beam #3 of the transmission antenna #0 of the BS 200 through the beam #6 of the reception antenna #0, the BS 200 may determine that an interference amount from a transmission antenna and beam having a beam bitmap value of '1' is large and an interference amount from a transmission antenna and beam having a beam bitmap value of '0' is small, and perform scheduling to provide a service to other MSs through the transmission antenna and beam having the beam bitmap value of '0'.

In addition, to support SU-MIMO, the MS 210 may determine an optimal beam set for a plurality of streams, and determine a PMI of each optimal beam set of each stream. A PMI necessary for SU-MIMO and a combination of a preferred transmission antenna and beam and a preferred reception antenna and beam is determined as in Equation 7 below when assuming that a transmission antenna of the BS 200 is '$N_{TX}$', the number of transmission streams is '$N_{stream}$', and the number of reception antennas of the MS 210 is '$N_{RX}$'.

Equation 7

$$[\overline{m}, \overline{n}, \overline{p}] = \underset{mH, nHB_t, PH}{\operatorname{argmax}} |H_{SU}(k.m, n)^m P(p)|$$

$$H_{SU}(k) = \begin{bmatrix} H(k, \Phi, \Theta) & H(k, \Phi, \Theta_n) \\ H(k, \Phi_m, \Theta) & H(k, \Phi_m, \Theta_n) \end{bmatrix}$$

Here, the '$P(p)$' signifies a Pth precoding matrix having a '$[N_t^{RF} \times N_{stream}]$' size.

In operation 911, the MS 210 feeds back the beam bitmap and/or PMI, to the BS 200. Thereafter, in operation 913, the MS 210 may receive scheduling information from the BS 200.

Thereafter, the MS 210 terminates the procedure according to the embodiment of the present disclosure.

Figure 10:
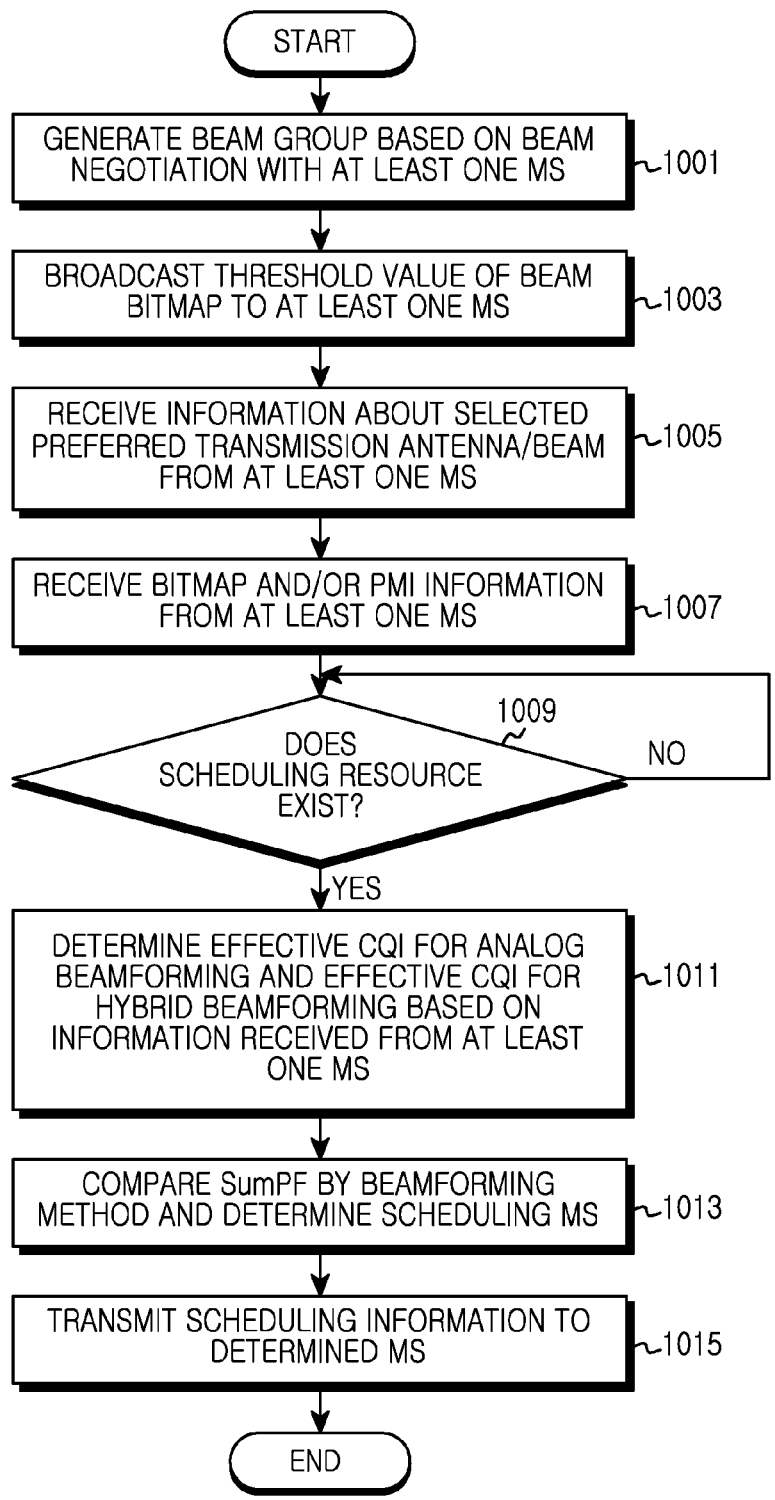
FIG. 10 is a diagram illustrating a scheduling procedure in a BS according to an embodiment of the present disclosure.

FIG. 10 is a diagram illustrating a scheduling procedure in a BS according to an embodiment of the present disclosure.

Referring to FIG. 10, in operation 1001, the BS 200 performs negotiation for beam grouping with at least one MS 210 within a service area, and generates a beam group. For instance, the BS 200 and the MS 210 may perform beam grouping based on a channel characteristic of each of a plurality of beams at a preset period or a specific event occurrence time point. For example, the BS 200 and the MS 210 may group beams supported by self into a plurality of beam groups based on a channel characteristic, such as a received signal strength of each beam, channel correlation, orthogonality, and the like, and exchange information about the beam groups with each other.

Thereafter, in operation 1003, the BS 200 broadcasts a threshold value of a beam bitmap to at least one MS. Here, the beam bitmap is information of interference that transmission antennas and beams of the BS 200 exert to an optimal reception antenna and beam selected in the MS 210, and may be constructed in a bitmap form. In addition, the threshold value of the beam bitmap is information used to generate or construct the beam bitmap in the MS 210, and may be determined in accordance to a load of a system, information about an isolation distribution of the MSs, or a scheduling policy. The threshold value of the beam bitmap may be a fixed value, or may be a variable value. The BS 200 may broadcast a changed threshold value whenever there is a change of the threshold value of the beam bitmap, and may broadcast a rule of changing the threshold value of the beam bitmap and allow the MS 210 to directly determine the changed threshold value. Additionally, the BS 200 may broadcast information representing whether the beam bitmap includes information about at least one beam included in one beam group, or whether the beam bitmap includes information about each of a plurality of beam groups.

Thereafter, in operation 1005, the BS 200 receives information about a selected preferred transmission antenna and beam from the at least one MS 210. In operation 1007, the BS 200 receives bitmap and/or PMI information from the at least one MS 210. Here, the preferred transmission antenna and beam signifies a transmission antenna and beam of the BS 200 included in an optimal beam set selected in the MS 210.

In operation 1009, the BS 200 determines if a scheduling resource assignable to the MS 210 exists. If the scheduling resource assignable to the MS 210 exists, the BS 200 proceeds to operation 1011 and determines an effective CQI for analog beamforming and an effective CQI for hybrid beamforming based on information received from the at least one MS 210. For instance, if the beam bitmap is received from the at least one MS 210, whenever a rank is added, the BS 200 may determine an effective CQI as in Equation 8 below.

$$eCQI(k,r) = f(CQI(k), \text{BeamBitmap}_{threshold}, \text{offset}(k,r))) \quad \text{Equation 8}$$

Here, the '$eCQI(k,r)$' signifies an effective CQI for a total number 'r' of ranks of a user 'k'. The '$CQI(k)$' signifies a CQI for the user 'k', and the '$\text{BeamBitmap}_{threshold}$' signifies a threshold value of a beam bitmap, and the 'offset(kr)' signifies an adjustment offset value of a scheduler for the user 'k' and the rank 'r'.

As one example, a method of determining the effective CQI for analog beamforming and the effective CQI for hybrid beamforming is described.

First, when the number of assignable ranks is 'r' and the effective CQI of the user 'k' is determined, if a beam having a bitmap of '1' is selected, the effective CQI of analog beamforming for the user 'k' may be determined as in Equation 9 below. In contrast, when the number of assignable ranks is 'r' and the effective CQI of the user 'k' is determined, if a beam having a bitmap of '0' is selected, the effective CQI of analog beamforming for the user 'k' may be determined as in Equation 10 below.

Equation 9

$$eCQI(k, r) = \frac{S(k)}{I(k) + n(k) + I_{beam}E(r-1)} + \text{offset}(k, r) =$$

$$\frac{1}{\frac{I(k) + n(k)}{S(k)} + \frac{I_{beam}}{S}E(r-1)} + \text{offset}(k, r) =$$

$$\frac{1}{\frac{1}{CQI(k)} + \frac{1}{BeamBitmap}P_{threshold}E(r-1)} + \text{offset}(k, r)$$

Equation 10

$$eCQI(k, r) = \frac{S(k)}{I(k) + n(k) + I_{beam}E(r-1)} + \text{offset}(k, r) =$$

$$\frac{1}{\frac{I(k) + n(k)}{S(k)} + \frac{I_{beam}}{S}E(r-1)} + \text{offset}(k, r)E$$

$$\frac{1}{\frac{1}{CQI(k)} + \frac{1}{CQI(k)}E(r-1)} + \text{offset}(k, r) = \frac{1}{r}CQI(k) + \text{offset}(k, r)$$

In Equations 9 and 10, the 'CQI(k)' is 'S(k)/(I(k+)n(k))', and the 'S(k)' signifies a signal strength for a user 'k', and the 'I(k' signifies an interference strength for the user 'k', and the 'n(k)' signifies a noise power of the user 'k'.

As another example, if a PMI is received from the at least one MS 210, whenever a rank is added, the BS 200 may determine the effective CQI for hybrid beamforming as in Equation 11 below.

Equation 11

$$eCQI(k, r) = |p_m E w_k|^2 CQI(k)$$

$$w = H^H(HH^H)^{-1}, \text{ where } \begin{cases} H = |p_1 \ldots p_{n-1}| \\ p_k = PMI \text{ for } k^{th} \text{ user} \end{cases}$$

$$= [w_1 w_2 \ldots w_r]$$

The '$p_k$' signifies a PMI reported by the MS 210 'k', and the '$w_k$' signifies a codebook based a multi-user weight value of the MS 210 'k'.

Thereafter, in operation 1013, the BS 200 may determine a sumPF representing an efficiency of each beamforming method using the determined each effective CQI, and compare the sumPFs of the respective beamforming methods and determine a scheduling MS 210. For instance, the BS 200 may determine the sumPF using the effective CQI as in Equation 12 below.

Equation 12

$$SumPF(R) = \sum_{r=1}^{r=R} \frac{\text{Rate}(eCQI(k, r), BW(k))}{Tput(k)}$$

For example, the BS 200 may determine a SumPF for analog beamforming using the effective CQI for analog beamforming, and determine a SumPF for hybrid beamforming using the effective CQI for hybrid beamforming. The BS 200 may compare values of the determined two SumPF and perform scheduling. For instance, if the SumPF for hybrid beamforming is greater than or is equal to the SumPF for analog beamforming, the BS 200 may perform scheduling of a user MS in the hybrid beamforming method. If the SumPF for hybrid beamforming is less than the SumPF for analog beamforming, the BS 200 may perform the scheduling of the user MS in the analog beamforming method.

Thereafter, in operation 1015, the BS 200 transmits scheduling information to the determined MS, and terminates the procedure according to the embodiment of the present disclosure.

Figure 11:
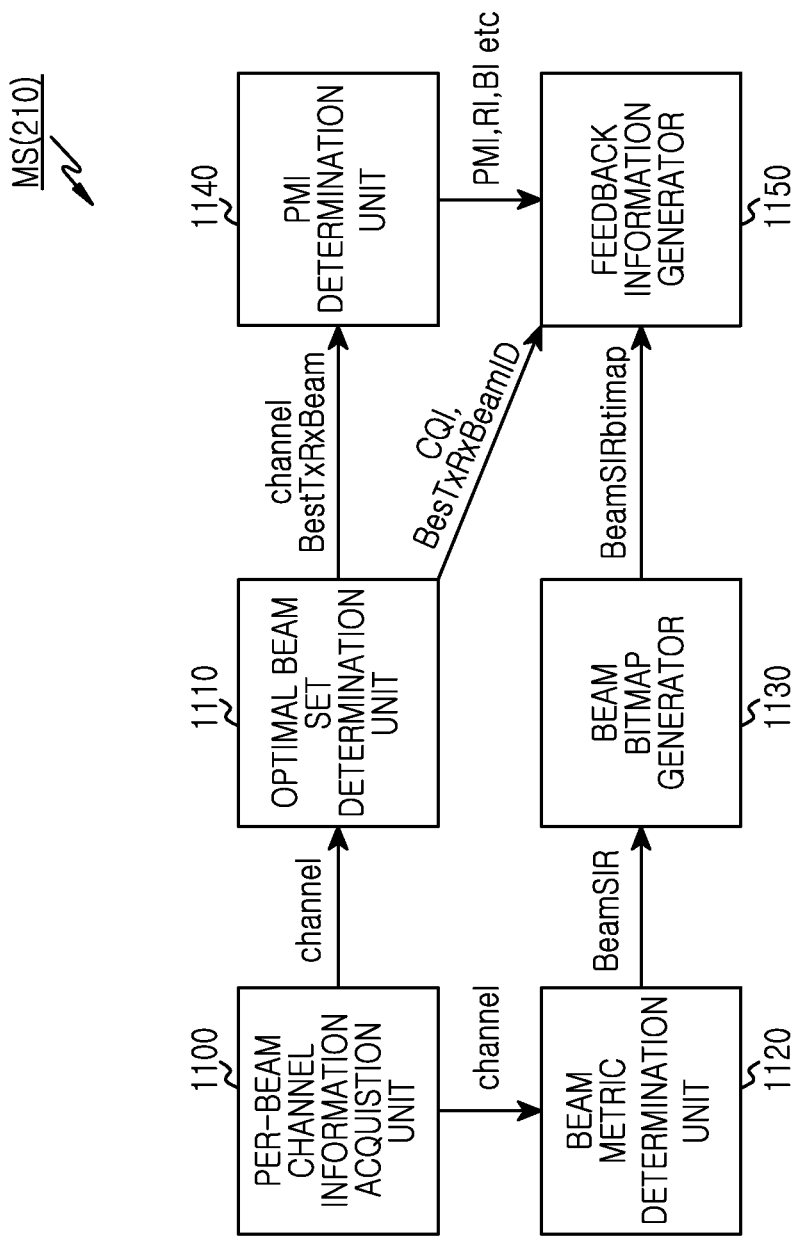
FIG. 11 is a block diagram illustrating a construction of an MS according to an embodiment of the present disclosure.

FIG. 11 is a diagram illustrating a construction of an MS according to an embodiment of the present disclosure.

Referring to FIG. 11, the MS 210 may include a per-beam channel information acquisition unit 1100, an optimal beam set determination unit 1110, a beam metric determination unit 1120, a beam bitmap generator 1130, a PMI determination unit 1140, and a feedback information generator 1150. Here, the respective constituent elements are distinguished and illustrated in accordance to a function of the MS 210 described in various embodiments of the present disclosure, but the illustrated respective constituent elements may be also implemented as one or more other constituent elements. For example, the constituent elements illustrated in FIG. 11 may be constructed as one control unit. The control unit may be called other terms, such as a processor, processing unit, and the like.

The per-beam channel information acquisition unit 1100 acquires channel information between a plurality of transmission beams formable by an antenna of the BS 200 and a plurality of reception beams formable by an antenna of the MS 210, and provides the acquired per-beam channel information to the optimal beam set determination unit 1110 and the beam metric determination unit 1120.

The optimal beam set determination unit 1110 determines a preferred optimal transmission antenna and beam and reception antenna and beam based on the per-beam channel information. For example, the optimal beam set determination unit 1110 selects a transmission antenna and beam of the BS 200 and a reception antenna and beam of the MS 210 having the highest CQI value, and determines the selected beam set as an optimal beam set. The optimal beam set determination unit 1110 provides information about the selected optimal beam set, to the PMI determination unit 1140 and the feedback information generator 1150. In addition, the optimal beam set determination unit 1110 may provide the per-beam channel information, to the feedback information generator 1150 and the PMI determination unit 1140. For example, the optimal beam set determination unit 1110 may provide a CQI for the optimal beam set to the feedback information generator 1150.

The beam metric determination unit 1120 generates various beam combinations of the transmission antenna and beam of the BS 200 and the reception antenna and beam of the MS 210, and determines a beam metric for the generated beam combinations. Here, the beam metric is a meaning including a capacity, a SINR, a SIR, or an RSS of a corresponding beam combination (e.g., a combination of an nth transmission beam of an ith transmission antenna and an mth reception beam of a jth reception antenna).

The beam bitmap generator 1130 receives beam metric information about the beam combinations from the beam metric determination unit 1120, and generates a beam bitmap, based on received information and a threshold value of a beam bitmap broadcasted from the BS 200. In other words, if the BS 200 supports a service to other MSs through a specific transmission antenna and beam, the beam bitmap generator 1130 may generate the beam bitmap representing an interference amount which self may receive from the specific transmission antenna and beam of the BS 200, in a situation in which the MS 210 receives a service through an optimal beam set from the BS 200. The beam bitmap generator 1130 provides the generated beam bitmap to the feedback information generator 1150.

The PMI determination unit 1140 may determine a PMI of an optimal beam set based on the per-beam channel information and the optimal beam set information provided from the optimal beam set determination unit 1110.

The feedback information generator 1150 controls and processes a function for processing the optimal beam set provided from the optimal beam set determination unit 1110 and CQI information about the optimal beam set, into information for feeding back to the BS 200, and feeding back the information to the BS 200. In addition, the feedback information generator 1150 controls and processes a function for feeding back the beam bitmap provided from the beam bitmap generator 1130 and the PMI provided from the PMI determination unit 1140, to the BS 200.

Additionally, although not illustrated in the drawings, the MS 210 may include a transceiver. The transceiver may include a plurality of antennas, thereby feeding back feedback information generated in the feedback information generator 1150 to the BS 200. In addition, the transceiver performs a function of transmitting/receiving a signal with the BS 200 through a plurality of antennas. Here, the antenna is a meaning including a beam antenna and/or array antenna capable of forming a beam in a specific direction.

Figure 12:
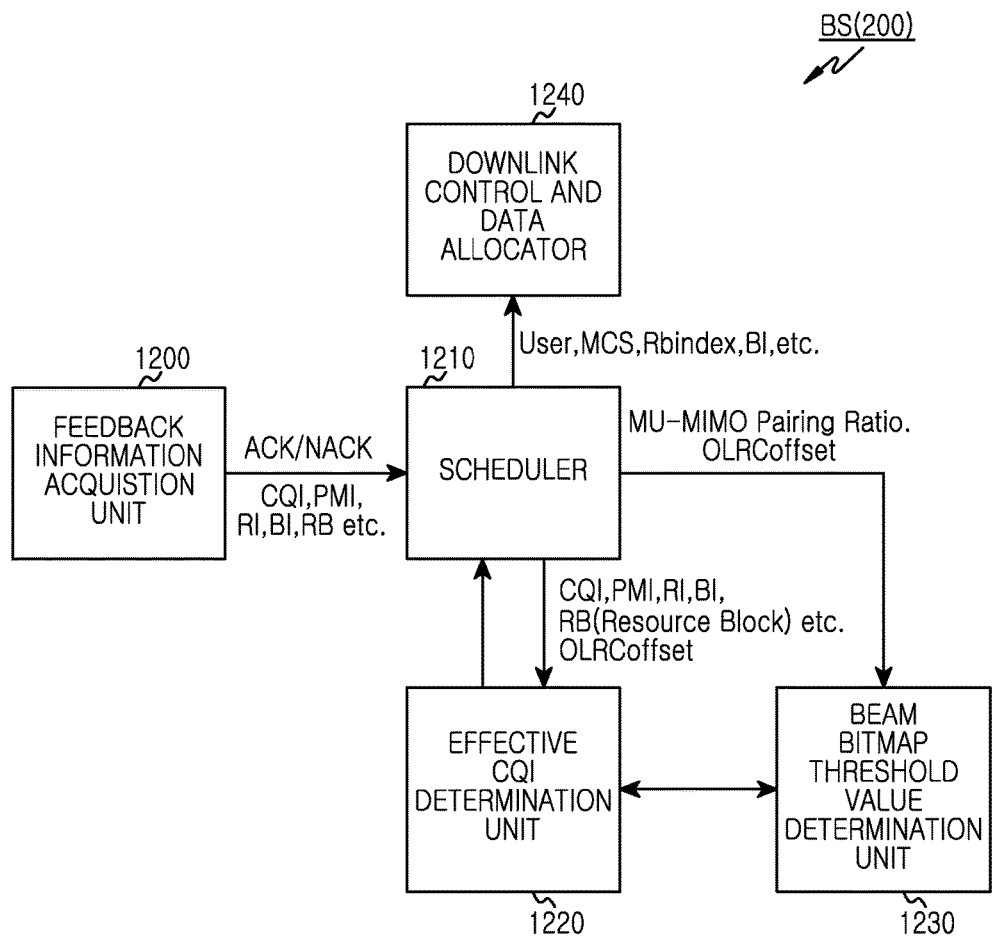
FIG. 12 is a block diagram illustrating a construction of a BS according to an embodiment of the present disclosure.

FIG. 12 is a diagram illustrating a construction of a BS according to an embodiment of the present disclosure.

Referring to FIG. 12, the BS 200 may include a feedback information acquisition unit 1200, a scheduler 1210, an effective CQI determination unit 1220, a beam bitmap threshold value determination unit 1230, and a downlink control and data allocator 1240. Here, the respective constituent elements are distinguished and illustrated in accordance to a function of the BS 200 described in various embodiments of the present disclosure, but the illustrated respective constituent elements may be also implemented as one or more other constituent elements. For example, the constituent elements illustrated in FIG. 12 may be constructed as one control unit. The control unit may be called other terms, such as a processor, processing unit, and the like.

The feedback information acquisition unit 1200 may acquire feedback information from signals received from the MS 210. For example, the feedback information acquisition unit 1200 may acquire information about an optimal beam set fed back from the MS 210 and channel information (e.g., CQI) about the optimal beam set, and may acquire beam bitmap and/or PMI information received from the MS 210.

The feedback information acquisition unit 1200 provides the acquired feedback information to the scheduler 1210.

The scheduler 1210 controls and processes a general function for scheduling of the MS 210. For example, the scheduler 1210 provides the feedback information of the MS 210 to the effective CQI determination unit 1220, and acquires an effective CQI for analog beamforming and an effective CQI for hybrid beamforming, and determines a SumPF for each of the effective CQI for analog beamforming and the effective CQI for hybrid beamforming, and compares the determined respective SumPF and performs the scheduling of the MS 210. The scheduler 210 controls and processes a function for performing the aforementioned general operations of the BS 200 shown in FIG. 2 to FIG. 10.

The effective CQI determination unit 1220 receives feedback information from the scheduler 1210, and determines an effective CQI for analog beamforming and an effective CQI for hybrid beamforming and provides the determined effective CQIs to the scheduler 1210.

The beam bitmap threshold value determination unit 1230 determines a threshold value of a beam bitmap. The beam bitmap threshold value determination unit 1230 may determine the threshold value of the beam bitmap in accordance to a load of a system, information about an isolation distribution of the MSs, or a scheduling policy. The threshold value of the beam bitmap may be a fixed value, or may be a variable value. Additionally, the beam bitmap threshold value determination unit 1230 may determine the unit of the beam bitmap.

The downlink control and data allocator 1240 controls and processes a function for allocating resources to each MS 210 based on a scheduling result of the scheduler 1210, and transmitting downlink control information and data.

Additionally, although not illustrated in the drawings, but the BS 200 may include a transceiver. The transceiver may include a plurality of antennas, thereby receiving feedback information from the MS 210 and processing the received feedback information. In addition, the transceiver performs a function for transmitting/receiving a signal with the MS 210 through a plurality of antennas. Here, the antenna is a meaning including a beam antenna and/or array antenna capable of forming a beam in a specific direction.

The present disclosure groups a plurality of beams formable by a plurality of antennas into a plurality of beam groups through negotiation of the BS 200 and the MS 210, and generates and transmits/receives beam-group based feedback information, thereby decreasing an operation complexity and feedback information amount of the MS 210, and the BS 200 has an effect of being capable of efficiently performing scheduling of MU-MIMO using restricted information.

While the disclosure has been shown and described with reference to certain preferred embodiments thereof, it will be understood by those skilled in the art that various changes in form and details may be made therein without departing from the spirit and scope of the disclosure as defined by the appended claims.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a mobile station (MS), the method comprising:
   determining a beam set with an optimal channel state among a plurality of beam sets, the beam set comprising a receive (Rx) beam of the MS and a transmit (Tx) beam of the BS associated with an antenna of the BS; and
   transmitting first information regarding the determined beam set and second information regarding interference that at least one first Tx beam of the BS causes to the MS,
   wherein the at least one first Tx beam of the BS is associated with another antenna of the BS.

2. The method of claim 1,
   wherein the plurality of beam sets are configured as combination of each of a plurality of Tx beams of the BS and each of a plurality of Rx beams of the MS,
   wherein the plurality of Rx beams of the MS comprise the Rx beam of the MS included in the beam set,
   wherein the plurality of Tx beams of the BS comprise the Tx beam of the BS included in the beam set,
   wherein the plurality of Tx beams of the BS comprise the at least one first Tx beam of the BS and at least one second Tx beam of the BS, and
   wherein the at least one second Tx beam of the BS is associated with the antenna of the BS.

3. The method of claim 1, further comprising:
   receiving, from the BS, a reference value for determining a bit map,
   wherein the second information comprises the bit map comprising at least one bit for indicating the interference that each of the at least one first Tx beam of the BS causes to the MS, and
   wherein each of the at least one bit is determined as a first value if a value for indicating the interference that each of the at least one first Tx beam causes to the MS is greater than the reference value and is determined as a second value if the value is equal to or less than the reference value.

4. The method of claim 1,
   wherein the second information is used for reducing interference that the at least one first Tx beam of the BS causes to the MS.

5. The method of claim 1, further comprising:
   receiving, from the BS, scheduling information determined based on the first information and the second information.

6. A method of a base station (BS), the method comprising:
   receiving, from a mobile station (MS), first information regarding a beam set comprising a reception (Rx) beam of the MS and a transmission (Tx) beam of the BS associated with an antenna of the BS, and second information regarding interference that at least one first Tx beam of the BS causes to the MS,
   wherein the beam set has an optimal channel state among a plurality of beam sets, and
   wherein the at least one first Tx beam of the BS is associated with another antenna of the BS.

7. The method of claim 6, wherein the plurality of beam sets are configured as combination of each of a plurality of Tx beams of the BS and each of a plurality of Rx beams of the MS,
   wherein the plurality of Rx beams of the MS comprise the Rx beam of the MS included in the beam set,
   wherein the plurality of Tx beams of the BS comprise the Tx beam of the BS included in the beam set,
   wherein the plurality of Tx beams of the BS comprise the at least one first Tx beam of the BS and at least one second Tx beam of the BS, and
   wherein the at least one second Tx beam of the BS is associated with the antenna of the BS.

8. The method of claim 6, further comprising:
   transmitting, to the MS, a reference value for determining a bit map,
   wherein the second information comprises the bit map comprising at least one bit for indicating the interference that each of the at least one first Tx beam of the BS causes to the MS, and
   wherein each of the at least one bit is determined as a first value if a value for indicating the interference that each of the at least one first Tx beam causes to the MS is greater than the reference value and is determined as a second value if the value is equal to or less than the reference value.

9. The method of claim 6,
   wherein the second information is used for reducing interference that the at least one Tx beam of the BS causes to the MS.

10. The method of claim 6, further comprising:
    determining scheduling information based on the first information and the second information; and
    transmitting, to the MS, the determined scheduling information.

11. An apparatus of a mobile station (MS), the apparatus comprising:
- at least one transceiver configured to transmit and receive a signal with a base station (BS); and
- at least one processor, coupled to the at least one transceiver, configured to:
  - determine a beam set with an optimal channel state among a plurality of beam sets, the beam set comprising a receive (Rx) beam of the MS and a transmit (Tx) beam of the BS associated with an antenna of the BS, and
  - control to transmit first information regarding the determined beam set and second information regarding interference that at least one first Tx beam of the BS causes to the MS,
- wherein the at least one first Tx beam of the BS is associated with another antenna of the BS.

12. The apparatus of claim 11,
- wherein the plurality of beam sets are configured as combination of each of a plurality of Tx beams of the BS and each of a plurality of Rx beams of the MS,
- wherein the plurality of Rx beams of the MS comprise the Rx beam of the MS included in the beam set,
- wherein the plurality of Tx beams of the Bs comprise the Tx beam of the BS included in the beam set,
- wherein the plurality of Tx beams of the BS comprise the at least one first Tx beam of the BS and at least one second Tx beam of the BS, and
- wherein the at least one second Tx beam of the BS is associated with the antenna of the BS.

13. The apparatus of claim 11,
- wherein the at least one processor is further configured to control to receive, from the BS, a reference value for determining a bit map,
- wherein the second information comprises the bit map comprising at least one bit for indicating the interference that each of the at least one first Tx beam of the BS causes to the MS, and
- wherein each of the at least one bit is determined as a first value if a value for indicating the interference that each of the at least one first Tx beam causes to the MS is greater than the reference value and is determined as a second value if the value is equal to or less than the reference value.

14. The apparatus of claim 11,
- wherein the second information is used for reducing interference that the at least one first Tx beam of the BS causes to the MS.

15. The apparatus of claim 11, wherein the at least one processor is further configured to receive, from the BS, scheduling information determined based on the first information and the second information.

16. An apparatus of a base station (BS), the apparatus comprising:
- at least one transceiver configured to transmit and receive a signal with a mobile station (MS); and
- at least one processor, coupled to the at least one transceiver, configured to:
  - control to receive, from a mobile station (MS), first information regarding a beam set comprising a reception (Rx) beam of the MS and a transmission (Tx) beam of the BS associated with an antenna of the BS, and second information regarding interference that at least one first Tx beam of the BS causes to the MS,
- wherein the beam set has an optimal channel state among a plurality of beam sets, and
- wherein the at least one first Tx beam of the BS is associated with another antenna of the BS.

17. The apparatus of claim 16,
- wherein the plurality of beam sets are configured as combination of each of a plurality of Tx beams of the BS and each of a plurality of Rx beams of the MS,
- wherein the plurality of Rx beams of the MS comprise the Rx beam of the MS included in the beam set,
- wherein the plurality of Tx beams of the Bs comprise the Tx beam of the BS included in the beam set,
- wherein the plurality of Tx beams of the BS comprise the at least one first Tx beam of the BS and at least one second Tx beam of the BS, and
- wherein the at least one second Tx beam of the BS is associated with the antenna of the BS.

18. The apparatus of claim 16,
- wherein the at least one processor is further configured to control to transmit, to the MS, a reference value for determining a bit map,
- wherein the second information comprises the bit map comprising at least one bit for indicating the interference that each of the at least one first Tx beam of the BS causes to the MS, and
- wherein each of the at least one bit is determined as a first value if a value for indicating the interference that each of the at least one first Tx beam causes to the MS is greater than the reference value and is determined as a second value if the value is equal to or less than the reference value.

19. The apparatus of claim 16,
- wherein the second information is used for reducing interference that the at least one Tx beam of the BS causes to the MS.

20. The apparatus of claim 16, wherein the at least one processor is further configured to:
- determine scheduling information based on the first information and the second information; and
- control to transmit, to the MS, the determined scheduling information.

* * * * *